United States Patent
Mueller et al.

(10) Patent No.: US 10,623,649 B2
(45) Date of Patent: Apr. 14, 2020

(54) CAMERA ALIGNMENT BASED ON AN IMAGE CAPTURED BY THE CAMERA THAT CONTAINS A REFERENCE MARKER

(71) Applicant: Hewlett-Packard Development Company, L.P., Houston, TX (US)

(72) Inventors: Robert L Mueller, San Diego, CA (US); Jinman Kang, San Diego, CA (US); Santiago Garcia-Reyero Vinas, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 283 days.

(21) Appl. No.: 15/500,461

(22) PCT Filed: Jul. 31, 2014

(86) PCT No.: PCT/US2014/048994
§ 371 (c)(1),
(2) Date: Jan. 30, 2017

(87) PCT Pub. No.: WO2016/018327
PCT Pub. Date: Feb. 4, 2016

(65) Prior Publication Data
US 2017/0223279 A1    Aug. 3, 2017

(51) Int. Cl.
*H04N 5/232* (2006.01)
*G06T 7/80* (2017.01)
(Continued)

(52) U.S. Cl.
CPC ....... *H04N 5/23296* (2013.01); *G06F 3/0418* (2013.01); *G06F 3/0425* (2013.01);
(Continued)

(58) Field of Classification Search
CPC ................... H04N 5/232; A61B 2560/0223
(Continued)

(56) References Cited

U.S. PATENT DOCUMENTS 5,482,048 A * 1/1996 Johnson ............. G06K 9/00315
382/128
7,372,503 B2   5/2008 Maeda et al.
(Continued)

FOREIGN PATENT DOCUMENTS

KR   2011-0064238 A   6/2011
TW     200905610 A    5/1997
(Continued)

OTHER PUBLICATIONS

Kim et al., "Automatic Focus Control for Assembly Alignment in a Lens Module Process," Nov. 2009, pp. 292-297, IEEE.
(Continued)

*Primary Examiner* — Paulos M Natnael
(74) *Attorney, Agent, or Firm* — HP Inc. Patent Department

(57) ABSTRACT

Apparatuses, systems, and methods are provided for alignment of a camera based on an image captured by the camera. The camera can, for example, be supported by a support structure to face towards an image alignment reference marker such that an image captured by the camera contains the marker. The camera can, for example, be rotatably aligned relative to the marker to an aligned position based on the captured image.

15 Claims, 10 Drawing Sheets

(51) Int. Cl.
*G06T 7/70* (2017.01)
*H04N 5/225* (2006.01)
*H04N 5/33* (2006.01)
*H04N 9/31* (2006.01)
*G06F 3/041* (2006.01)
*G06F 3/042* (2006.01)
*H04N 17/00* (2006.01)
*H04N 13/271* (2018.01)

(52) U.S. Cl.
CPC ............... *G06T 7/70* (2017.01); *G06T 7/80* (2017.01); *H04N 5/2251* (2013.01); *H04N 9/3179* (2013.01); *H04N 9/3194* (2013.01); *H04N 17/002* (2013.01); *G06T 2207/30204* (2013.01); *G06T 2207/30244* (2013.01); *H04N 5/2252* (2013.01); *H04N 5/332* (2013.01); *H04N 13/271* (2018.05)

(58) Field of Classification Search
USPC .............. 348/175–178, 180–181, 187–189
See application file for complete search history.

(56) References Cited

U.S. PATENT DOCUMENTS

| | | | |
|---|---|---|---|
| 7,599,561 B2 | 10/2009 | Wilson et al. | |
| 7,710,391 B2 | 5/2010 | Bell et al. | |
| 7,723,741 B2 | 5/2010 | Farnworth et al. | |
| 7,911,532 B2 | 3/2011 | Pai et al. | |
| 7,993,944 B2 | 8/2011 | Oliver et al. | |
| 8,121,640 B2 | 2/2012 | Russ et al. | |
| 8,199,117 B2 | 6/2012 | Izadi et al. | |
| 8,223,193 B2* | 7/2012 | Zhao | G01D 1/00 348/42 |
| 8,605,174 B2 | 12/2013 | Namie et al. | |
| 8,736,583 B2 | 5/2014 | Anderson et al. | |
| 9,283,672 B1* | 3/2016 | Matthews | G01M 99/008 |
| 9,622,021 B2* | 4/2017 | Russo | F16M 11/048 |
| 2005/0078092 A1 | 4/2005 | Clapper | |
| 2007/0115361 A1* | 5/2007 | Bolas | H04N 5/74 348/189 |
| 2008/0018591 A1 | 1/2008 | Pittel et al. | |
| 2008/0133091 A1 | 6/2008 | Park et al. | |
| 2008/0316368 A1* | 12/2008 | Fritsch | H04N 5/23203 348/722 |
| 2010/0020180 A1* | 1/2010 | Hill | H04N 5/2253 348/188 |
| 2011/0211076 A1* | 9/2011 | Li | A61B 5/06 348/187 |
| 2011/0242054 A1 | 10/2011 | Tsu | |
| 2012/0293692 A1 | 11/2012 | Namie | |
| 2013/0077236 A1 | 3/2013 | Becze et al. | |
| 2013/0271604 A1 | 10/2013 | Follesa et al. | |
| 2014/0226028 A1* | 8/2014 | Wright | G03B 21/14 348/189 |
| 2015/0029345 A1* | 1/2015 | Ikeda | G06T 7/0018 348/187 |

FOREIGN PATENT DOCUMENTS

| | | |
|---|---|---|
| TW | 200933287 A | 8/1998 |
| TW | 201214335 A | 4/2013 |
| TW | 201324025 A | 6/2013 |

OTHER PUBLICATIONS

Shahram Izadi et al., "C-Slate: A Multi-Touch and Object Recognition System for Remote Collaboration using Horizontal Surfaces,", 2007, pp. 3-10, IEEE.

* cited by examiner

Aligned position

Initial position

US 10,623,649 B2

CAMERA ALIGNMENT BASED ON AN IMAGE CAPTURED BY THE CAMERA THAT CONTAINS A REFERENCE MARKER

BACKGROUND

Cameras commonly use photographic film, electronic sensors, or other processes to capture photographs and videos. Some cameras, such as certain handheld cameras, are designed to be carried and operated by a user, whereas other cameras are mounted to a fixed location or integrated within a housing of a device, such as a web camera integrated into the housing of a laptop.

BRIEF DESCRIPTION OF THE DRAWINGS

For a detailed description of various examples, reference will now be made to the accompanying drawings in which.

NOTATION AND NOMENCLATURE

Figure 1:
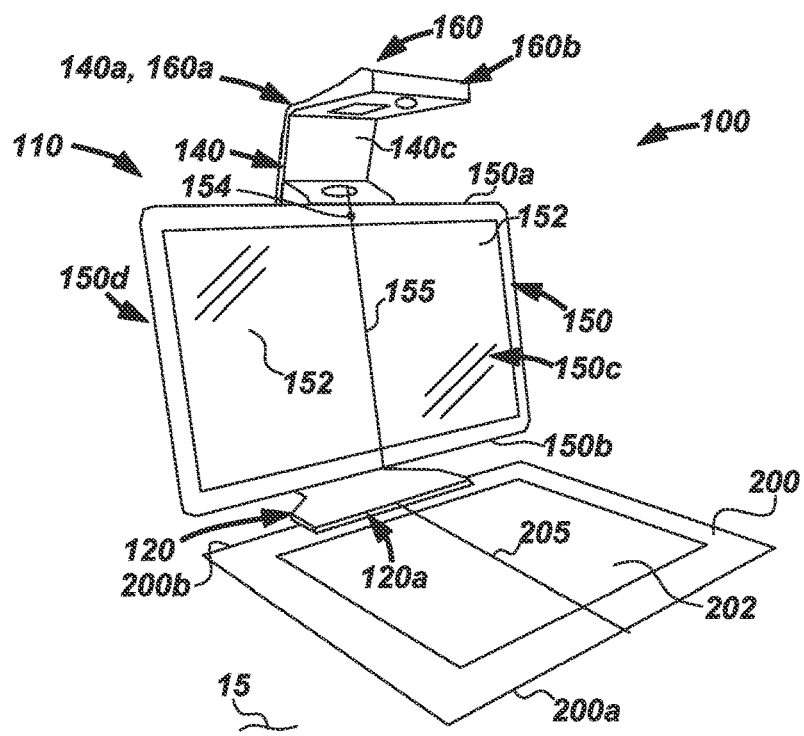
FIG. 1 is an example schematic perspective view of an example of a computer system in accordance with the principles disclosed herein.
Figure 2:
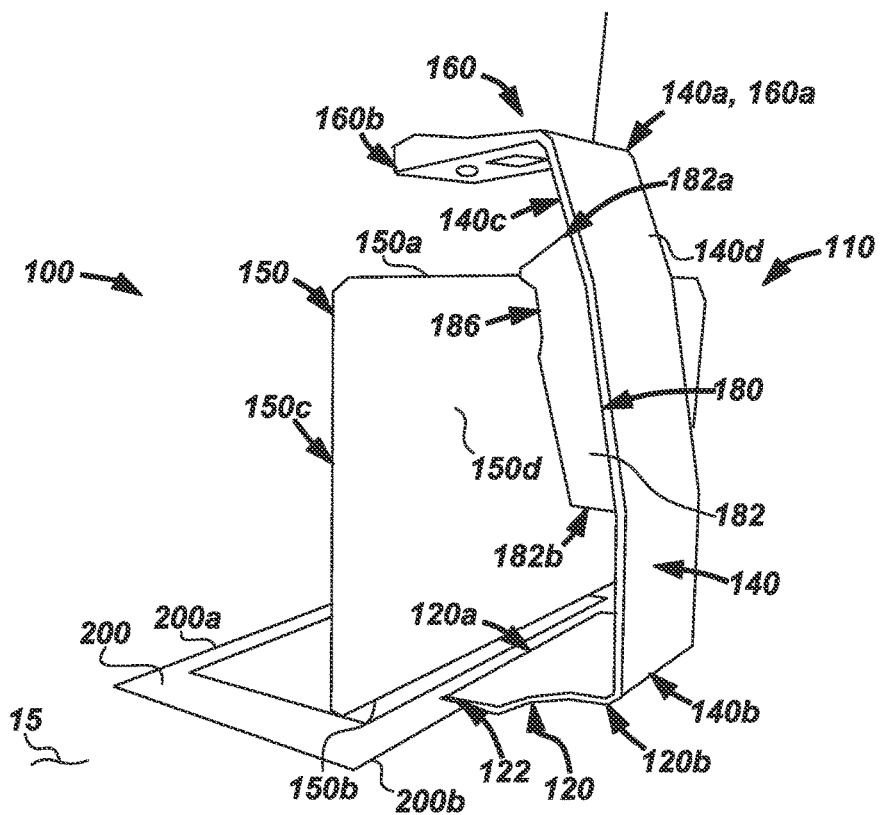
FIG. 2 is another example schematic perspective view of the computer system of FIG. 1 in accordance with the principles disclosed herein.

Certain terms are used throughout the following description and claims to refer to particular apparatus and system components. As one skilled in the art will appreciate, certain companies or other entities may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to include indirect and/or direct connections. Thus, if a first device is coupled to a second device, that coupling may, for example, be: (1) through a direct electrical or mechanical connection, (2) through an indirect electrical or mechanical connection via other devices and connections, (3) through an optical electrical connection, (4) through a wireless electrical connection, and/or (5) another suitable coupling. The term "approximately" as used herein to modify a value is intended to be determined based on the understanding of one of ordinary skill in the art, and can, for example, mean plus or minus 10% of that value.

DETAILED DESCRIPTION

The following discussion is directed to various examples of the disclosure. Although one or more of these examples may be preferred, the examples disclosed should not be interpreted, or otherwise used, as limiting the scope of the disclosure, including the claims. In addition, one skilled in the art will understand that the following description has broad application, and the discussion of any example is meant only to be descriptive of that example, and not intended to intimate that the scope of the disclosure, including the claims, is limited to that example.

Certain manufacturing processes for electronics can tend to result in a high degree of variation-especially high volume manufacturing processes used to fabricate low cost electronics. For example, certain manufacturing processes for electronic camera systems can result in undesired misalignment of elements of the camera (e.g., the lens, film, sensor, etc.). For handheld cameras, this is not typically an issue due to the infinite adjustment capability of the camera in a person's hand or mounted on an adjustable tripod. However, for fixed mount camera systems—such as certain cameras integrated within a housing of a computing device such as a laptop, any such misalignment can be a source of degraded quality and increased complexity in the overall image processing system. To overcome such misalignment, substantial investment can be made in manufacturing equipment and camera design complexity to achieve a much higher degree of precision. However, such solutions can significantly increase cost, complexity, and size of the design. As an alternative, digital correction, such as image post processing, can be used. However, such correction may lead to anti-aliasing artifacts in the final rendered image, can require CPU bandwidth, and may introduce latency in the image capture cycle time.

As described further herein, some implementations of a solution to these issues can provide for an apparatus or system that allow a camera to be aligned based on an image captured by the camera. For example, the camera can be aligned to an aligned position that is determined based on an image of an image alignment reference marker taken by the camera. The alignment of the camera can, for example, be performed manually by a human operator and/or by an electromechanical system that can automatically respond to feedback from an image processing algorithm and can make mechanical adjustments based on the feedback.

Referring to FIGS. 1-4, a computer system 100 that can benefit from a solution is shown. In this example, system 100 generally comprises a support structure 110, a computing device 150, a projector unit 180, and a touch sensitive mat 200. Computing device 150 may comprise any suitable computing device while still complying with the principles disclosed herein. For example, in some implementations, device 150 may comprise an electronic display, a smartphone, a tablet, an all-in-one computer (i.e., a display that also houses the computer's board), or some combination thereof. In this example, device 150 is an all-in-one computer that includes a central axis or center line 155, first or top side 150a, a second or bottom side 150b axially opposite the top side 150a, a front side 150c extending axially between the sides 150a, 150b, a rear side 150d also extending axially between the sides 150a, 150b and generally radially opposite the front side 150c. A display 152 defines a viewing surface and is disposed along the front side 150c to project images for viewing and interaction by a user (not shown). In some examples, display 152 includes touch sensitive technology such as, for example, resistive, capacitive, acoustic wave, infrared (IR), strain gauge, optical, acoustic pulse recognition, or some combination thereof. Therefore, throughout the following description, display 152 may periodically be referred to as a touch sensitive surface or display.

In addition, in some examples, device 150 further includes a camera 154 that is to take images of a user while he or she is positioned in front of display 152. In some implementations, camera 154 is a web camera. Further, in some examples, device 150 also includes a microphone or similar device that is arranged to receive sound inputs (e.g., voice) from a user during operation.

Referring still to FIGS. 1-4, support structure 110 includes a base 120, an upright member 140, and a top 160. Base 120 includes a first or front end 120a, and a second or rear end 120b. During operation, base 120 engages with a support surface 15 to support the weight of at least a portion of the components (e.g., member 140, unit 180, device 150, top 160, etc.) of system 100 during operation. In this example, front end 120a of base 120 includes a raised portion 122 that is slightly separated above the support surface 15 thereby creating a space or clearance between portion 122 and surface 15. As will be explained in more detail below, during operation of system 100, one side of mat 200 is received within the space formed between portion 122 and surface 15 to ensure proper alignment of mat 200. However, it should be appreciated that in other examples, other suitable alignment methods or devices may be used while still complying with the principles disclosed herein.

Upright member 140 includes a first or upper end 140a, a second or lower end 140b opposite the upper end 140a, a first or front side 140c extending between the ends 140a, 140b, and a second or rear side 140d opposite the front side 140c and also extending between the ends 140a, 140b. The lower end 140b of member 140 is coupled to the rear end 120b of base 120, such that member 140 extends substantially upward from the support surface 15.

Top 160 includes a first or proximate end 160a, a second or distal end 160b opposite the proximate end 160a, a top surface 160c extending between the ends 160a, 160b, and a bottom surface 160d opposite the top surface 160c and also extending between the ends 160a, 160b. Proximate end 160a of top 160 is coupled to upper end 140a of upright member 140 such that distal end 160b extends outward therefrom. As a result, in the example shown in FIG. 2, top 160 is supported only at end 160a and thus is referred to herein as a "cantilevered" top. In some examples, base 120, member 140, and top 160 are all monolithically formed; however, it should be appreciated that in other examples, base 120, member 140, and/or top 160 may not be monolithically formed while still complying with the principles disclosed herein.

Referring still to FIGS. 1-4, mat 200 includes a central axis or centerline 205, a first or front side 200a, and a second or rear side 200b axially opposite the front side 200a. In this example, a touch sensitive surface 202 is disposed on mat 200 and is substantially aligned with the axis 205. Surface 202 may comprise any suitable touch sensitive technology for detecting and tracking one or multiple touch inputs by a user in order to allow the user to interact with software being executed by device 150 or some other computing device (not shown). For example, in some implementations, surface 202 may utilize known touch sensitive technologies such as, for example, resistive, capacitive, acoustic wave, infrared, strain gauge, optical, acoustic pulse recognition, or some combination thereof while still complying with the principles disclosed herein. In addition, in this example, surface 202 extends over only a portion of mat 200; however, it should be appreciated that in other examples, surface 202 may extend over substantially all of mat 200 while still complying with the principles disclosed herein.

During operation, mat 200 is aligned with base 120 of structure 110, as previously described to ensure proper alignment thereof. In particular, in this example, rear side 200b of mat 200 is placed between the raised portion 122 of base 120 and support surface 15 such that rear end 200b is aligned with front side 120a of base, thereby ensuring proper overall alignment of mat 200, and particularly surface 202, with other components within system 100. In some examples, mat 200 is aligned with device 150 such that the center line 155 of device 150 is substantially aligned with center line 205 of mat 200; however, other alignments are possible.

In addition, as will be described in more detail below, in at least some examples surface 202 of mat 200 and device 150 are electrically coupled to one another such that user inputs received by surface 202 are communicated to device 150. Any suitable wireless or wired electrical coupling or connection may be used between surface 202 and device 150 such as, for example, WI-FI, BLUETOOTH®, ultrasonic, electrical cables, electrical leads, electrical spring-loaded pogo pins with magnetic holding force, or some combination thereof, while still complying with the principles disclosed herein. In this example, exposed electrical contacts disposed on rear side 200b of mat 200 engage with corresponding electrical pogo-pin leads within portion 122 of base 120 to transfer signals between device 150 and surface 202 during operation. In addition, in this example, the electrical contacts are held together by adjacent magnets located in the clearance between portion 122 of base 120 and surface 15, previously described, to magnetically attract and hold (e.g., mechanically) a corresponding ferrous and/or magnetic material disposed along rear side 200b of mat 200.

Figure 3:
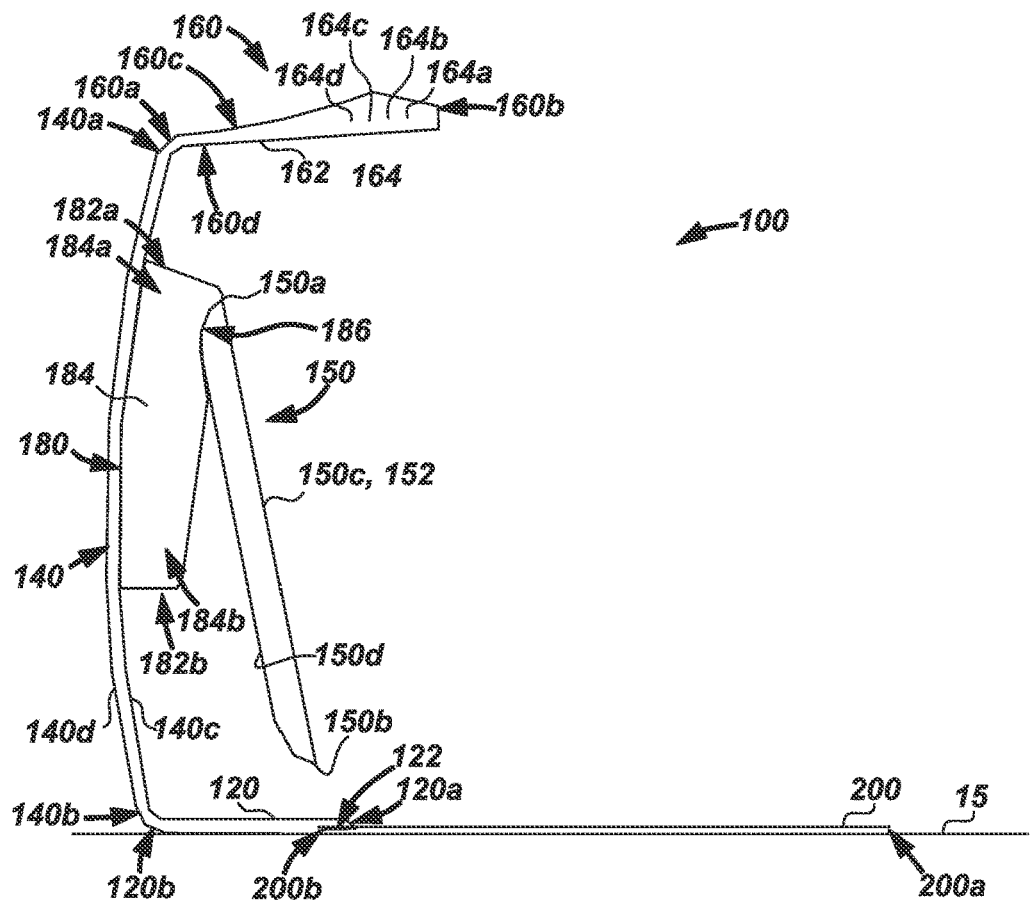
FIG. 3 is an example schematic side view of the computer system of FIG. 1 in accordance with the principles disclosed herein.

Referring specifically now to FIG. 3, projector unit 180 comprises an outer housing 182, and a projector assembly 184 disposed within housing 182. Housing 182 includes a first or upper end 182a, a second or lower end 182b opposite the upper end 182a, and an inner cavity 183. In this implementation, housing 182 further includes a coupling or mounting member 186 to engage with and support device 150 during operations.

In general, member 186 may be any suitable member or device for suspending and supporting a computer device (e.g., device 150) while still complying with the principles disclosed herein. For example, in some implementations, member 186 comprises a hinge that includes an axis of rotation such that a user (not shown) may rotate device 150 about the axis of rotation to attain an optimal viewing angle therewith. Further, in some examples, device 150 is permanently or semi-permanently attached to housing 182 of unit 180. For example, in some implementations, the housing 182 and device 150 are integrally and/or monolithically formed as a single unit.

Figure 4:
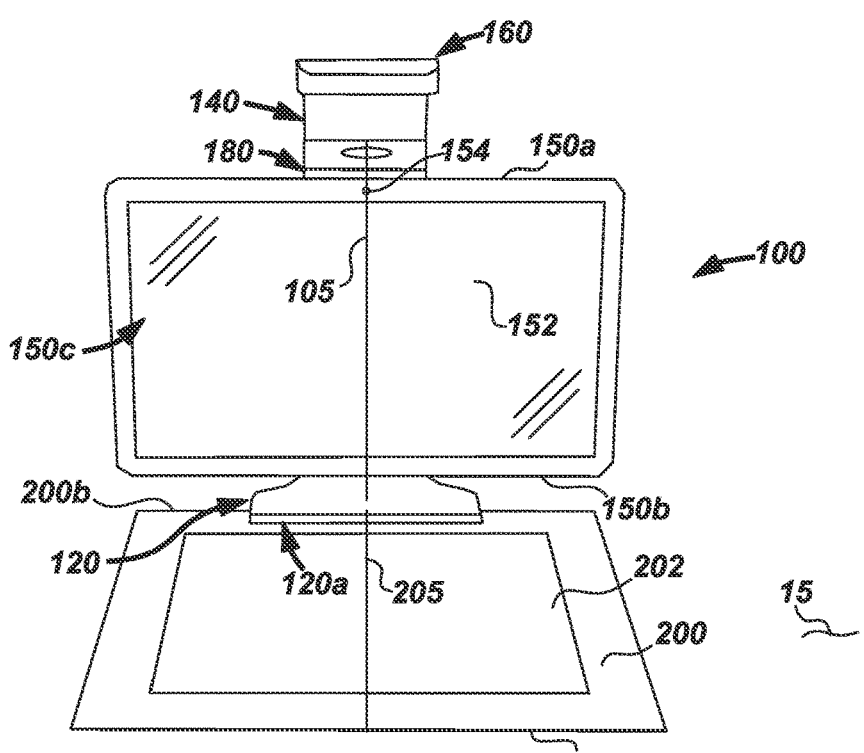
FIG. 4 is an example schematic front view of the computer system of FIG. 1 in accordance with the principles disclosed herein.

Thus, referring briefly to FIG. 4, when device 150 is suspended from structure 110 through the mounting member 186 on housing 182, projector unit 180 (i.e., both housing 182 and assembly 184) is substantially hidden behind device 150 when system 100 is viewed from a viewing surface or viewing angle that is substantially facing display 152 disposed on front side 150c of device 150. In addition, as is also shown in FIG. 4, when device 150 is suspended from structure 110 in the manner described, projector unit 180 (i.e., both housing 182 and assembly 184) and any image projected thereby is substantially aligned or centered with respect to the center line 155 of device 150.

Projector assembly 184 is generally disposed within cavity 183 of housing 182, and includes a first or upper end 184a, a second or lower end 184b opposite the upper end 184a. Upper end 184a is proximate upper end 182a of housing 182 while lower end 184b is proximate lower end 182b of housing 182. Projector assembly 184 may comprise any suitable digital light projector assembly for receiving data from a computing device (e.g., device 150) and projecting an image or images (e.g., out of upper end 184a) that correspond with that input data. For example, in some implementations, projector assembly 184 comprises a digital light processing (DIP) projector or a liquid crystal on silicon (LCoS) projector which are advantageously compact and power efficient projection engines capable of multiple display resolutions and sizes, such as, for example, standard XGA (1024×768) resolution 4:3 aspect ratio or standard WXGA (1280×800) resolution 16:10 aspect ratio. Projector assembly 184 is further electrically coupled to device 150 in order to receive data therefrom for producing light and images from end 184a during operation. Projector assembly 184 may be electrically coupled to device 150 through any suitable type of electrical coupling while still complying with the principles disclosed herein. For example, in some implementations, assembly 184 is electrically coupled to device 150 through an electric conductor, WI-FI, BLUETOOTH®, an optical connection, an ultrasonic connection, or some combination thereof. In this example, device 150 is electrically coupled to assembly 184 through electrical leads or conductors (previously described) that are disposed within mounting member 186 such that when device 150 is suspended from structure 110 through member 186, the electrical leads disposed within member 186 contact corresponding leads or conductors disposed on device 150.

Referring still to FIG. 3, top 160 further includes a fold mirror 162 and a sensor bundle 164. Mirror 162 includes a highly reflective surface 162a that is disposed along bottom surface 160d of top 160 and is positioned to reflect images and/or light projected from upper end 184a of projector assembly 184 toward mat 200 during operation. Mirror 162 may comprise any suitable type of mirror or reflective surface while still complying with the principles disclosed herein. In this example, fold mirror 162 comprises a standard front surface vacuum metalized aluminum coated glass mirror that acts to fold light emitted from assembly 184 down to mat 200. In other examples, mirror 162 could have a complex aspherical curvature to act as a reflective lens element to provide additional focusing power or optical correction.

Sensor bundle 164 includes a plurality of sensors and/or cameras to measure and/or detect various parameters occurring on or near mat 200 during operation. For example, in the specific implementation depicted in FIG. 3, bundle 164 includes an ambient light sensor 164a, a camera (e.g., a color camera) 164b, a depth sensor or camera 164c, and a three dimensional (3D) user interface sensor 164d.

Ambient light sensor 164a is arranged to measure the intensity of light of the environment surrounding system 100, in order to, in some implementations, adjust the camera's and/or sensor's (e.g., sensors 164a, 164b, 164c, 164d) exposure settings, and/or adjust the intensity of the light emitted from other sources throughout system such as, for example, projector assembly 184, display 152, etc.

Camera 164b may, in some instances, comprise a color camera which is arranged to take either a still image or a video of an object and/or document disposed on mat 200. Camera 164b is secured to top 160 of support structure 110. As described below, camera 164b can, for example: (1) be used to capture an image of an image alignment reference marker, (2) rotatably aligned to an aligned position based on the captured image, and (3) secured in the aligned position. Various examples of suitable apparatuses, systems, and methods for such processes are described in depth below with respect to FIGS. 8-14.

Depth sensor camera 164c generally indicates when a 3D object is on the work surface. In particular, depth sensor camera 164c may sense or detect the presence, shape, contours, motion, and/or the 3D depth of an object (or specific feature(s) of an object) placed on mat 200 during operation. Thus, in some implementations, sensor 164c may employ any suitable camera arrangement to sense and detect a 3D object and/or an image formed by depth values of pixels (whether infrared, color, or other) disposed in the sensor's field-of-view (FOV). For example, in some implementations sensor camera 164c may comprise a single infrared (IR) camera sensor with a uniform flood of IR light, a dual IR camera sensor with a uniform flood of IR light, structured light depth sensor technology, time-of-flight (TOF) depth sensor technology, or some combination thereof. It is appreciated that the term "camera" used with respect to depth sensor camera 164c is intended to include any suitable sensor assembly for depth sensing, and not only includes assemblies that capture images of electromagnetic radiation within the visible spectrum, but also assemblies that capture "non-visible" images, such as infrared, x-ray, sonar, thermal images, etc.

Depth sensor camera 164c is secured to top 160 of support structure 110. As described below, camera 164c can, for example: (1) be used to capture an image of an image alignment reference marker, (2) rotatably aligned to an aligned position based on the captured image, and (3) secured in the aligned position. Various examples of suitable apparatuses, systems, and methods for such processes are described in depth below with respect to FIGS. 8-14.

User interface sensor 164d includes any suitable device or devices (e.g., sensor or camera) for tracking a user input device such as, for example, a hand, stylus, pointing device, etc. In some implementations, sensor 164d includes a pair of cameras which are arranged to stereoscopically track the location of a user input device (e.g., a stylus) as it is moved by a user about the mat 200, and particularly about surface 202 of mat 200. In other examples, sensor 164d may also or alternatively include an infrared camera(s) or sensor(s) that is arranged to detect infrared light that is either emitted or reflected by a user input device. It should further be appreciated that bundle 164 may comprise other sensors and/or cameras either in lieu of or in addition to sensors 164a, 164b, 164c, 164d, previously described. In addition, as will be explained in more detail below, each of the sensors 164a, 164b, 164c, 164d within bundle 164 is electrically and communicatively coupled to device 150 such that data generated within bundle 164 may be transmitted to device 150 and commands issued by device 150 may be communicated to the sensors 164a, 164b, 164c, 164d during operations. As is explained above for other components of system 100, any suitable electrical and/or communicative coupling may be used to couple sensor bundle 164 to device 150 such as for example, an electric conductor, WI-FI, BLUETOOTH®, an optical connection, an ultrasonic connection, or some combination thereof. In this example, electrical conductors are routed from bundle 164, through top 160, upright member 140, and projector unit 180 and into device 150 through the leads that are disposed within mounting member 186, previously described.

It is appreciated that the term "camera" used with respect to user interface sensor 164d is intended to include any suitable sensor assembly for tracking a user input device, and not only includes assemblies that capture images of electromagnetic radiation within the visible spectrum, but also assemblies that capture "non-visible" images, such as infrared, x-ray, sonar, thermal images, etc.

In implementations where user interface sensor 164d includes one or more cameras, such cameras can be secured to top 160 of support structure 110. As described below, such cameras can, for example: (1) be used to capture an image of an image alignment reference marker, (2) rotatably aligned to an aligned position based on the captured image, and (3) secured in the aligned position. Various examples of suitable apparatuses, systems, and methods for such processes are described in depth below with respect to FIGS. 8-14.

Figure 5:
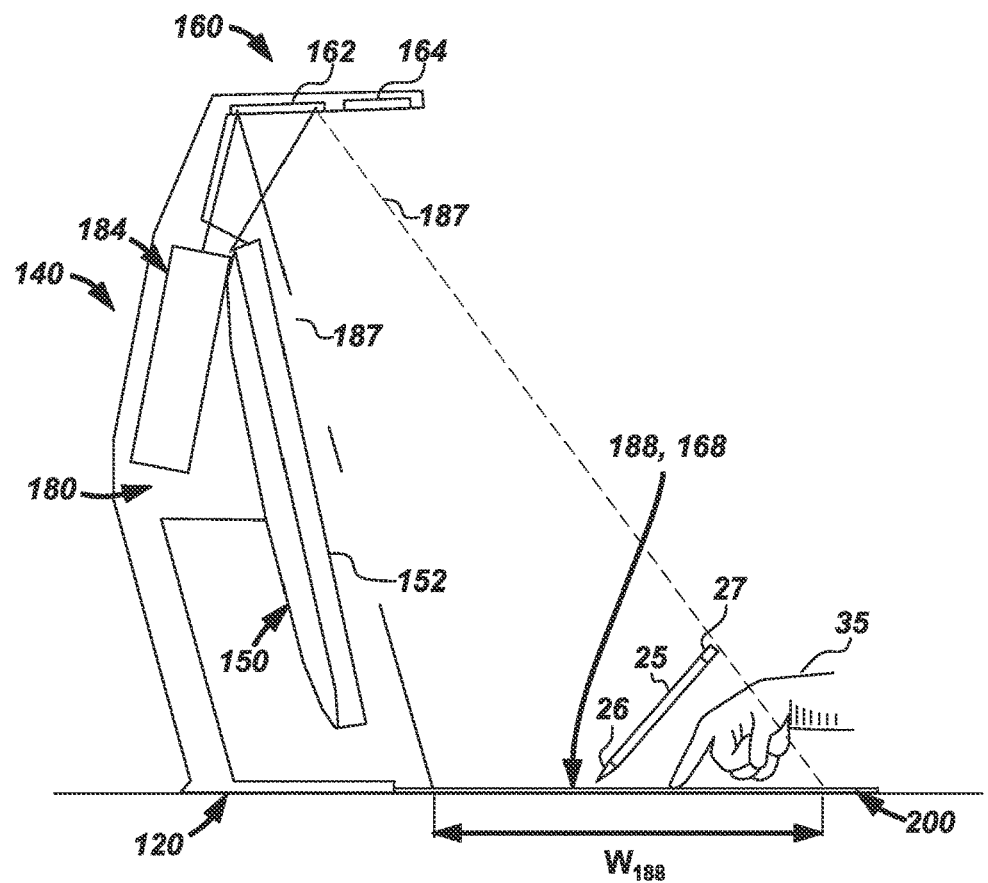
FIG. 5 is an example schematic side view of the computer system of FIG. 1 during operation in accordance with the principles disclosed herein.
Figure 6:
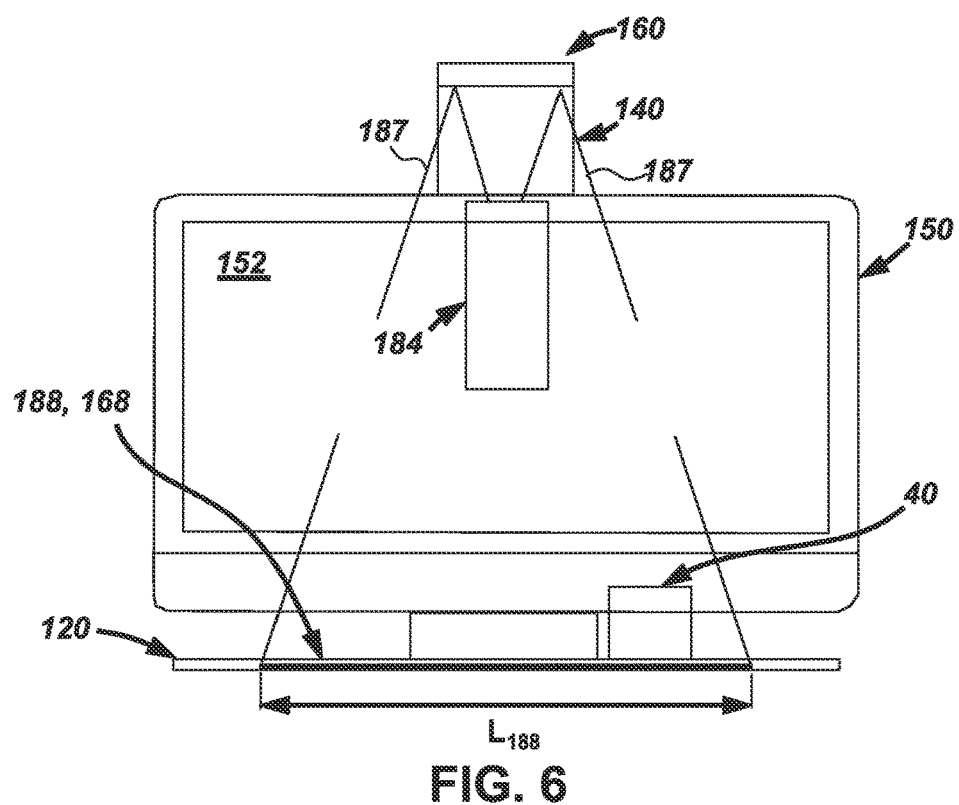
FIG. 6 is an example schematic front view of the system of FIG. 1 during operation in accordance with the principles disclosed herein.

Referring now to FIGS. 5 and 6, during operation of system 100, light 187 is emitted from projector assembly 184, and reflected off of mirror 162 towards mat 200 thereby displaying an image on a projector display space 188. In this example, space 188 is substantially rectangular and is defined by a length $L_{188}$ and a width $W_{188}$. In some examples length $L_{188}$ may equal approximately 16 inches, while width $W_{188}$ may equal approximately 12 inches; however, it should be appreciated that other values for both length $L_{188}$ and width $W_{188}$ may be used while still complying with the principles disclosed herein. In addition, the sensors (e.g., sensors 164a, 164b, 164c, and 164d) within bundle 164 include a sensed space 168 that, in at least some examples, overlaps and/or corresponds with projector display space 188, previously described. Space 168 defines the area that the sensors within bundle 164 are arranged to monitor and/or detect the conditions thereof in the manner previously described. In some examples, both space 188 and space 168 coincide or correspond with surface 202 of mat 200, previously described, to effectively integrate the functionality of the touch sensitive surface 202, projector assembly 184, and sensor bundle 164 within a defined area.

Figure 7:
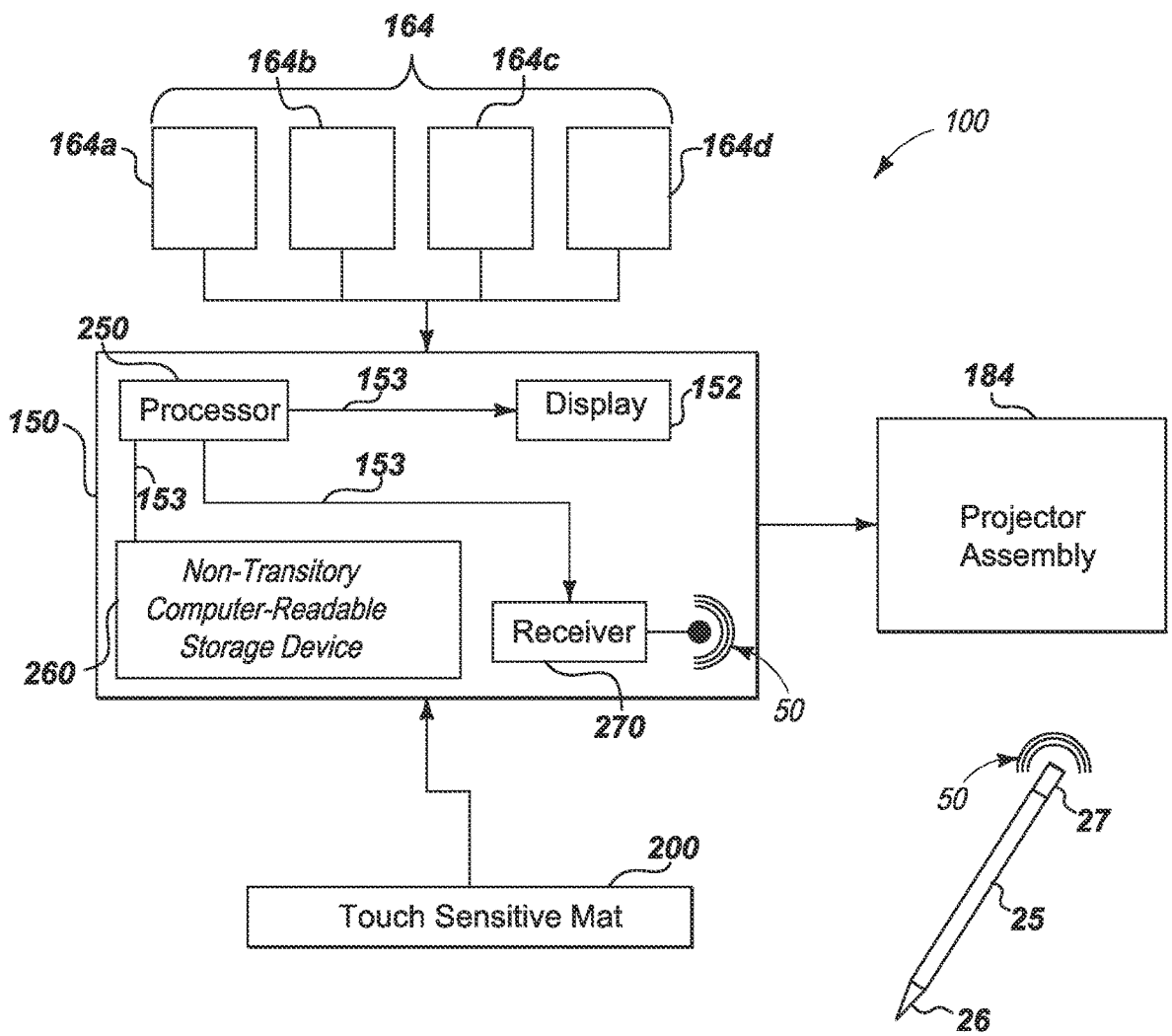
FIG. 7 is an example black box circuit diagram of the computer system of FIG. 1 in accordance with the principles disclosed herein.

Referring now to FIGS. 5-7, in some examples, device 150 directs assembly 184 to project an image onto surface 202 of mat 200. In addition, device 150 may also display an image on the display 152 (which may or may not be the same as the image projected onto surface 202 by assembly 184). The image projected by assembly 184 may comprise information and/or images produced by software executing within device 150. A user (not shown) may then interact with the image displayed on surface 202 and display 152 by physically engaging the touch sensitive surface 202 of mat 200. Such interaction may take place through any suitable method such as, direct interaction with a user's hand 35, through a stylus 25, or other suitable user input device(s).

As best shown in FIG. 7, when a user interacts with surface 202 of mat 200, a signal is generated which is routed to device 150 through any of the electrical coupling methods and devices previously described. Once device 150 receives the signal generated within mat 200, it is routed, through internal conductor paths 153, to a processor 250 which communicates with a non-transitory computer-readable storage device 260 to generate an output signal which is then routed back to projector assembly 184 and/or display 152 to implement a change in the image projected onto surface 202 and/or the image displayed on display 152, respectively. It should also be appreciated that during this process, a user may also be interacting with the image displayed on display 152 through engagement with the touch sensitive surface disposed thereon and/or through another user input device such as, for example, a keyboard and mouse.

In addition, in some examples, stylus 25 further includes a transmitter 27 that is arranged to track the position of stylus 25 (whether or not stylus 25 is interacting with surface 202) and to communicate with a receiver 270 disposed within device 150 through a wireless signal 50. In these examples, input received by receiver 270 from transmitter 27 on stylus 25 is also routed through paths 153 to processor 250 such that an output signal may be generated and routed to the assembly 184 and/or the display 152 as previously described.

Further, in some examples, sensors disposed within bundle 164 (e.g., sensors 164a, 164b, 164c, 164d) may also generate system input which is routed to device 150 for further processing by processor 250 and device 260. For example, in some implementations, sensors within bundle 164 may sense the location and/or presence of a user's hand 35 or stylus 25 and then generate an input signal which is routed to processor 250. Processor 250 then generates a corresponding output signal which is routed to display 152 and/or projector assembly 184 in the manner described above. In particular, in some implementations, bundle 164 includes a pair of cameras or sensors that are arranged to perform stereoscopic stylus tracking (e.g., of stylus 25). In still other implementations, stylus 25 includes a tip 26 that is coated in an infrared retro-reflective coating (e.g., paint), thus allowing it to serve as an infrared retro-reflector. Bundle 164 (and more particularly sensors 164c or 164d) may then further include infrared cameras or sensors as previously described which detect infrared light that is reflected off of tip 26 of stylus 25 and thus track the location of tip 26 as is moves across surface 202 during operation.

As a result, in some examples, the image projected onto surface 202 by assembly 184 serves as a second or alternative touch sensitive display within system 100. In addition, interaction with the image displayed on surface 202 is further enhanced through use of the sensors (e.g., sensors 164a, 164b, 164c, 164d) disposed within bundle 164 as described above.

Referring still to FIGS. 5-7, in addition, during operation of at least some examples, system 100 may capture a two dimensional (2D) image or create a 3D scan of a physical object such that an image of the object may then be projected onto the surface 202 for further use and manipulation thereof. In particular, in some examples, an object 40 may be placed on surface 202 such that sensors (e.g., camera 164b, depth sensor 164c, etc.) within bundle 164 may detect, for instance, the location, dimensions, and in some instances, the color of object 40, to enhance a 2D image or create a 3D scan thereof. The information gathered by the sensors (e.g., sensors 164*b*, 164*c*) within bundle 164 may then be routed to processor 250 which communicates with device 260 as previously described. Thereafter, processor 350 directs projector assembly 184 to project an image of the object 40 onto the surface 202. It should also be appreciated that in some examples, other objects such as documents or photos may also be scanned by sensors within bundle 164 in order to generate an image thereof which is projected onto surface 202 with assembly 184. In addition, in some examples, once an object(s) is scanned by sensors within bundle 164, the background of the image may be optionally, digitally removed within the resulting image projected onto surface 202 (or shown on display 152 of device 150). Thus, in some examples, images of physical objects (e.g., object 40) may be captured, digitized, and displayed on surface 202 during operation to quickly and easily create a digital version of a physical object to allow for further manipulation thereof consistent with the manner described herein.

In the manner described, through use of examples of a computer system 100 in accordance with the principles disclosed herein, an additional touch sensitive display may be projected onto a touch sensitive surface (e.g., surface 202) to provide dual screen capability for a computing device (e.g., device 150). In addition, through use of a computer system 100 in accordance with the principles disclosed herein, a physical object (e.g., object 40) may be scanned thereby creating a digital version of the physical object for viewing and/or manipulation on a display surface of a computing device (e.g., display 152 and/or surface 202). Further, through use of a computer system 100 in accordance with the principles disclosed herein, a digital shared workstation for remotely positioned users (e.g., users 300A, 300B) may be created wherein physical content may be scanned, digitized, and shared among all concurrent users of the digital collaboration workstation, and user interaction with the digital content and/or physical objection is visible by all participants.

While device 150 has been described as an all-in-one computer, it should be appreciated that in other examples, device 150 may further employ the use of more traditional user input devices such as, for example, a keyboard and a mouse. In addition, while sensors 164*a*, 164*b*, 164*c*, 164*d* within bundle 164 have been described as each representing a single sensor or camera, it should be appreciated that each of the sensors 164*a*, 164*b*, 164*c*, and 164*d* may each include multiple sensors or cameras while still complying with the principles described herein. Further, while top 160 has been described herein as a cantilevered top, it should be appreciated that in other examples, top 160 may be supported at more than one point and is thus may not be cantilevered while still complying with the principles disclosed herein.

Figure 8:
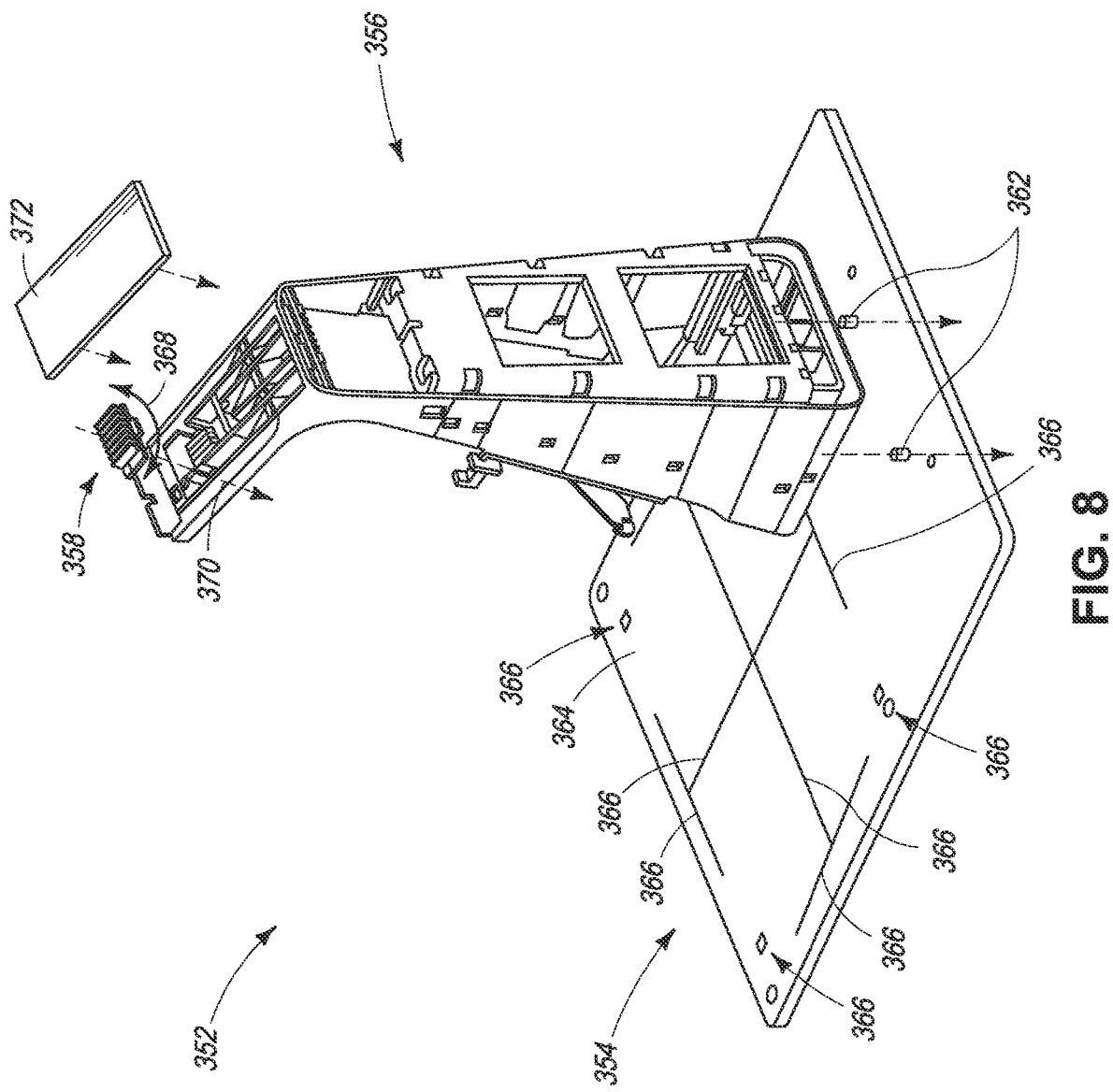
FIG. 8 is an example partially exploded view of an apparatus in accordance with the principles disclosed herein.
Figure 9:
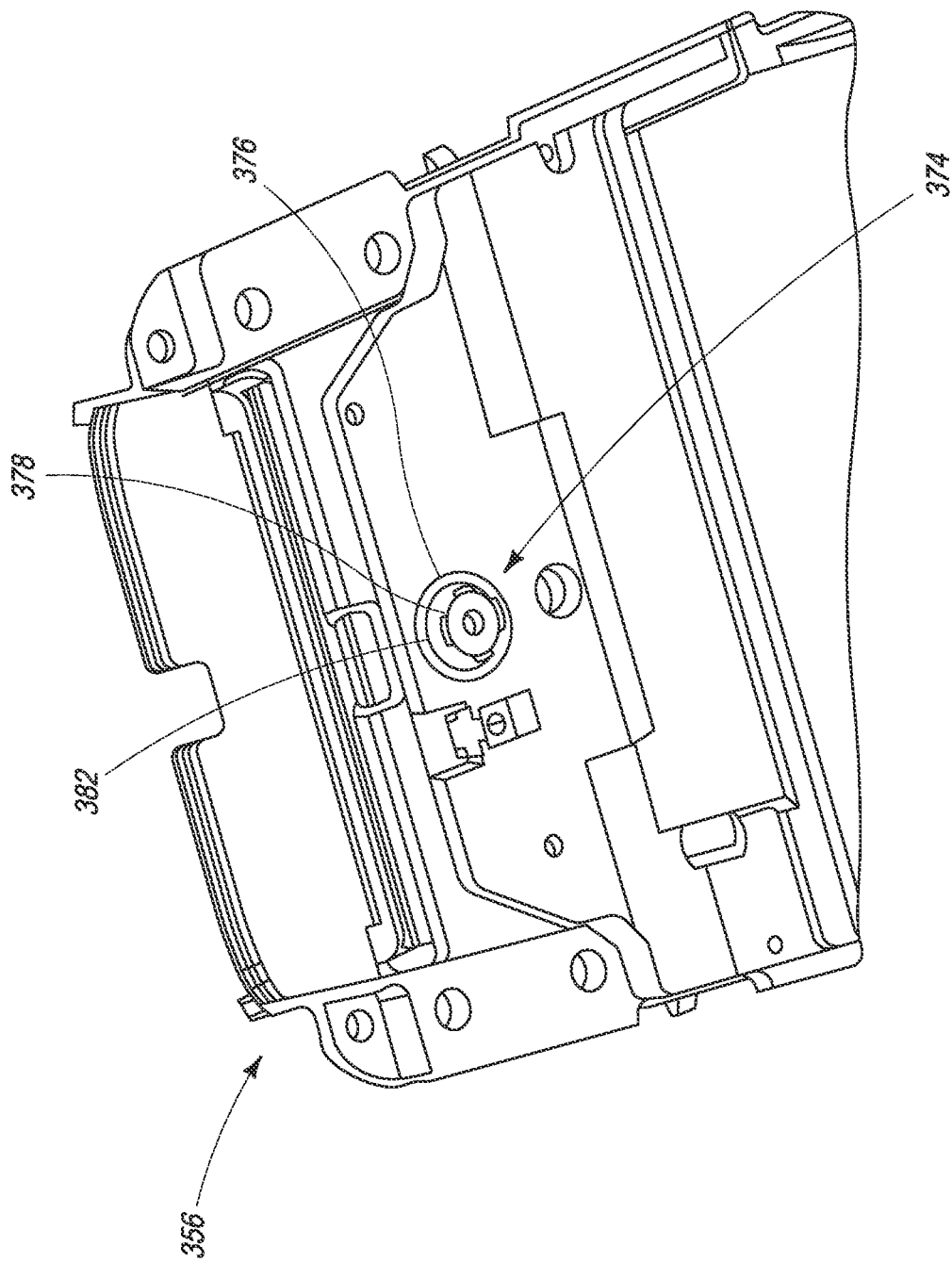
FIG. 9 is an example bottom view of a portion of the apparatus of FIG. 8.
Figure 10:
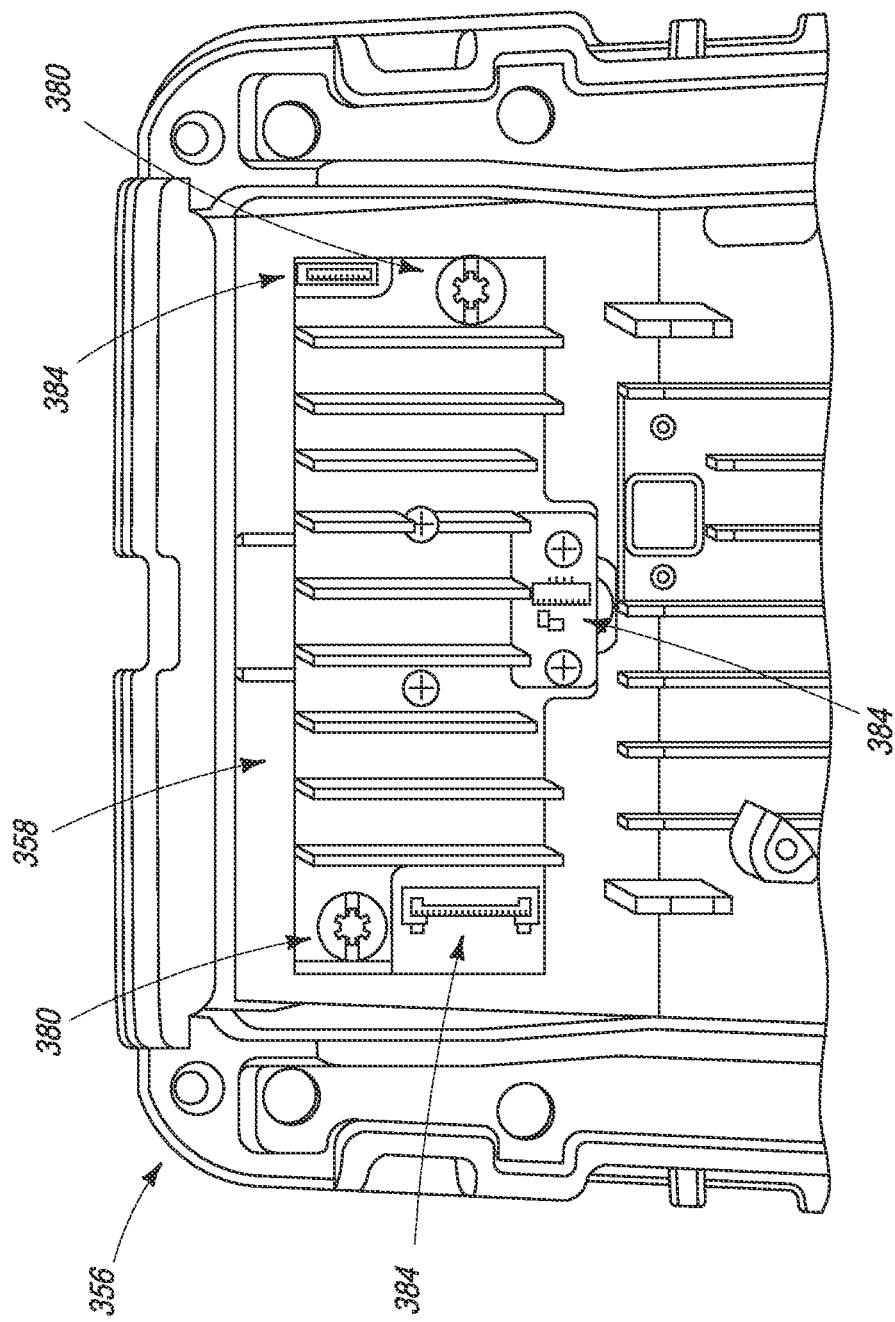
FIG. 10 is an example top view of a portion of the apparatus of FIG. 8.

FIGS. 8-10 illustrate one example of an apparatus 352 that allows a camera, such as one or more cameras described above, to be rotatably aligned during installation based on an image of a reference marker captured by the camera. In particular, FIG. 8 illustrates a partially exploded view of apparatus 352, FIG. 9 illustrates a bottom view of a portion of apparatus 352 focusing on a camera opening of a support structure of apparatus 352 as described below, and FIG. 10 illustrates a view of apparatus 352 including a camera and securing elements to secure the camera to the support structure of apparatus 352 as described below. Apparatus 352 includes a calibration plate 354, a support structure 356, a camera 358, and securing elements 380. It is appreciated that one or more structural or functional aspects of other systems or apparatuses described herein, such as computer system 100 or its component parts, can be implemented in apparatus 352 or vice versa.

Calibration plate 354 can, for example, be used as a reference to calibrate a rotational alignment of camera 358 during installation or another time. As depicted in FIG. 8, calibration plate 354 can, for example, be in the shape of a thin, substantially rectangular plate having substantially planar top and bottom surfaces. In some implementations, one or more surfaces or portions of surfaces of calibration plate 354 can be non-planar. For example, in some implementations, a portion (e.g., a central portion) of a given surface (e.g., a top surface 360) is planar while another portion (e.g., a peripheral portion) of that surface is non-planar. As another example, in some implementations, a top surface of calibration plate 354 is non-planar whereas a side surface of calibration plate 354 is planar.

Calibration plate 354 can be affixed to support structure 356 to assist with installing or otherwise calibrating camera 358 and/or other elements of computer system 100 (e.g., to assist with installing projector assembly 184). Calibration plate 354 can, for example, be secured to support structure 356 via screws 362 of other suitable fasteners that are secured to support structure 356 through holes formed in calibration plate 354. In some implementations, after such elements are installed, calibration plate 354 can be removed from support structure 356 and affixed to another computer system, thereby allowing a single calibration plate 354 to calibrate several different units. As an alternative, calibration plate 354 can be in the form of an element intended for use with apparatus 352, such as, for example, touch sensitive mat 200, or another component of computer system 100, such as a housing of system 100.

Calibration plate 354 can include a calibration surface 364 that includes one or more image alignment reference markers 366 to assist in aligning camera 358. As depicted in FIG. 8, top surface 360 of calibration plate 354 can serve as calibration surface 364 and can include multiple image alignment reference markers 366. In some implementations, a side or bottom surface of calibration plate 354 can serve as a calibration surface 364. Moreover, in some implementations, a portion (e.g., a central portion) of a given surface (e.g., top surface 360) serves as calibration surface 364 while another portion (e.g., a peripheral portion) of that surface does not serve as calibration surface 364. Although calibration surface 364 is depicted in FIG. 8 as being a planar surface, it is appreciated that in some implementations, calibration surface 364 is a non-planar surface.

Image alignment reference markers 366 may be selected based on a type of marker that camera 358 is able to sense. For example, in implementations where camera 358 can record images in the visible spectrum, markers 366 can, for example, be in the form of markings painted on calibration surface 364, stickers affixed to calibration surface 364, holes formed in calibration surface 364, and/or other suitable markers that can be detected by camera 358. In implementations where camera 358 can record images in the non-visible spectrum (e.g., an ultraviolet camera), markers 366 can, for example, be in the form of non-visible markers (e.g., ultraviolet markers).

Figure 13:
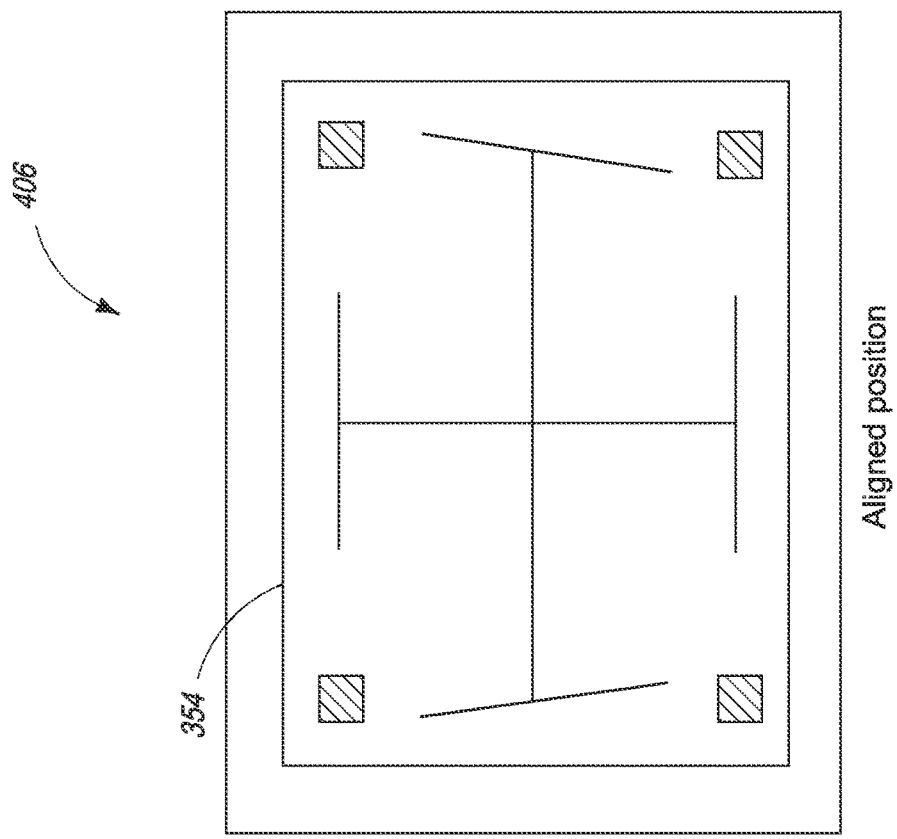
FIG. 13 is an example schematic top view of an image captured by the camera for the system of FIG. 11 in an aligned position.

As depicted in FIG. 8, markers 366 can, for example, be in the form of four image alignment reference markers that correspond to four corners of an image to be captured by camera 358 in an aligned position. An aligned position for the camera can, for example, correspond to a rotational position where post-processing "straightening" of the captured image is not needed. One example of an aligned position is depicted in FIG. 13, which depicts three horizontal segments of reference markers 366 parallel to the two horizontal perimeter sides of captured image 406. This aligned position can be compared to the unaligned position of FIG. 12, where these horizontal segments are not parallel to the horizontal perimeter sides of captured image 404. It is appreciated that other alignment axes may be compared in certain situations, such as for example if captured image 406 does not include straight perimeter sides. The exact degree of alignment may be dependent on the application. For example, in some applications, the alignment axis of calibration surface 354 should be parallel to the corresponding alignment axis of the captured image to within about 1 degree. For less sensitive applications, the alignment axis of calibration surface 354 can be deemed "aligned" if it is parallel to the corresponding alignment axis of the captured image to within about 2, 5, 10 or more degrees.

It is appreciated that markers 366 can be provided in another suitable pattern. Markers 366 can be a single point, such as a circular or square dot, and/or may be lines or other shapes (e.g., such as the various lines depicted in calibration surface 364 of FIG. 8). In some implementations, markers 366 can be three-dimensional, for example, a marker 366 provided on an upwardly facing calibration surface (e.g., calibration surface 364 depicted in FIG. 8) can extend upward in the form of a pillar or other shape. Similarly, a first set of markers can be provided to face in a first direction (e.g., facing vertically) and a second set of markers can be provided to face in a second direction (e.g., facing laterally). Such an implementation can, for example, be used to allow camera 358 to be aligned in multiple rotational directions, such as a first rotational direction 368 around a rotational axis 370 (which can, for example, correspond to an imaging axis of camera 358 as shown in FIG. 8) and a second rotational direction that corresponds to another axis, such as a pitch axis of camera 358.

In some implementations, a first set of markers 366 can correspond to a first position of camera 358 (e.g., facing downwards towards mat 200), whereas a second set of markers 366 can correspond to a second position of camera 358 (e.g., facing forward towards a user). Similarly, a first set of markers 366 can be used for a first camera of system 100 and a second set of markers 366 can be used for a second camera of system 100.

In some implementations, image alignment reference markers 366 can be provided on or otherwise based on another element of system 100 or apparatus 352. For example, reference markers 366 can be provided on or based on touch sensitive mat 200. That is, markers 366 can, for example, be in the form of an outside or internal edge of calibration surface 364, calibration plate 354, and/or an element of apparatus 352 or system 100 (e.g., an edge of touch sensitive mat 200, support structure 356, or another element used with system 100). In some implementations, markers 366 can be in the form of a temporary image displayed by projector unit 180 onto a surface, such as onto calibration surface 364 or onto a table top that serves as a temporary calibration surface. In some implementations, markers 366 can be moved from a first location to a second location using projector unit 180 or another mechanism to allow alignment of camera 358 in different positions.

Support structure 356 can, for example, be used to support camera 358 to face towards calibration surface 364. It is appreciated that the term "face towards" and related terms used herein with reference to camera 358 are intended to refer to an imaging direction of camera 358, such as for example along axis 370 in FIG. 8. For example, in implementations where calibration surface 364 faces upwards, support structure 356 can support camera 358 above calibration surface 364. Likewise, in implementations where calibration surface 364 faces laterally to the left, support structure 356 can support camera 358 to face laterally to the right towards calibration surface 364. In some implementations, support structure 356 is securable to calibration surface 364 via calibration plate 354 at a single predetermined location to face towards calibration surface 364 at a predetermined position relative to marker 366. As depicted for example in FIG. 8, camera 358 can be secured to support structure 356 such that camera 358 is disposed over calibration surface 364 and within a footprint formed by markers 366.

As described above, one or more structural or functional aspects of support structure 110 can be implemented in support structure 356 or vice versa. For example, although support structure 110 of computer system 100 is illustrated differently in FIG. 1 compared to support structure 356 of FIG. 8, support structure 356 can include certain aspects of support structure 110, such as its exact mechanical structure, functionality, or interfaces with other elements of computer system 100. Similarly, support structure 110 can include one or more aspects of support structure 110. For example, support structure 356 can include a coupling member for a projector unit, such as coupling member 186 described above with respect to computer system 100. In some implementations, support structure 356 can include a cover 372 that can be secured to support structure 356 to restrict tampering of the alignment of camera 358 after camera 358 is installed.

Support structure 356 can include a camera opening 374, which can, for example, allow camera 358 to capture an image containing marker 366 through camera opening 374. In some implementations, camera opening 374 can include a hole formed in support structure 356. In some implementations, camera opening 374 can include a transparent, tinted, or other suitable barrier to protect a lens, sensor, or other element of camera 358 but otherwise allow camera 358 to capture an image through camera opening 374. In some implementations, camera opening 374 can include a shutter that can be opened to allow camera 358 to capture an image through camera opening 374. It is appreciated that in certain implementations, such as for example where camera 358 is designed to capture an image based on electromagnetic radiation outside the visible spectrum, camera opening 374 may not actually be in the form of a complete opening that allows light to pass through support structure 356 to camera 358, but may instead be in the form of a cavity that securely receives camera 358 to point camera 358 towards marker 366 of calibration surface 364. In such an implementation, camera 358 can capture an image of a marker 366 through the material of support structure 356 without a direct "line of sight" between camera 358 and marker 366.

As illustrated for example in FIG. 9, camera opening 374 can include an inner surface 376 that can be sized to rotatably mate with an outer surface 378 of camera 358 to allow camera 358 to be rotatably aligned relative to camera opening 374 to an aligned position based on an image captured by camera 358. The term "rotatably mate" and similar terms used herein are intended to include couplings that allow relative rotation (e.g., such as by providing an air gap between mating peripheral surfaces and/or through sliding contact between the mating peripheral surfaces). For example, outer surface 378 of camera 358 can be defined by a substantially cylindrical lens barrel having a slightly smaller outer diameter than a diameter of a cylindrical inner surface 376 of camera opening 374. Other similar mating relationships can be provided. For example, in some implementations, camera 358 can be rotatably mated with support structure 356 by way of a bearing assembly. In such an implementation, outer surface 378 of camera 358 can, for example, be in direct contact with an inner race that is integrated with or otherwise coupled to camera opening 374. The rotatable mating between camera 358 and support structure 356 can be substantially frictionless or can include a desired amount of friction.

Securing element 380 can, for example, be used to secure camera 358 to support structure 356 in an aligned position during installation of camera 358. Securing element 380 can, for example, be in the form of a rigid fastener, such as a screw, bolt, nail, or the like, or another type of securing element, such as a magnet-based securing assembly, adhesive, fabric hook and loop fastener, etc. For example, in some implementations, securing element 380 can include one or more screws (e.g., as depicted in FIG. 10), that screw into corresponding holes of support structure 356. In some implementations, a hole of support structure 356 can be in the form of a slot that allows a securing element (e.g., a nut and bolt) to be secured at a position in the slot corresponding to an aligned position of camera 358.

In some implementations, securing element 380 is secured at the same location of support structure 356 regardless of the alignment of camera 358. For example, in some implementations, an element of camera 358 (e.g., lens barrel 382 shown in FIG. 9) is rotated to align camera 358 in the aligned position while another element (e.g., an outer housing of camera 358) that interfaces with securing element 380 is maintained in a constant position regardless of the alignment of camera 358. In some implementations, support structure 356 can include multiple and distinct holes to allow camera 358 to be secured in a selected alignment position corresponding to a distinct hole of support structure 356.

As described above, camera 358 can be used to capture an image containing marker 366 through camera opening 374 of support structure 356. Camera 358 can, for example, be in the form of one or more cameras described above with respect to computer system 100, such as cameras 154, 164b, 164c, as well as cameras used in other parts, such as for example, any cameras used in user interface sensor 164d. As described above, camera 358 can be designed to capture images of electromagnetic radiation within the visible spectrum, as well as "non-visible" images, such as infrared, x-ray, sonar, thermal images, etc. In certain implementations, camera 358 can include an electronic sensor for detecting radiation or other detectable signals. Camera 358 can include one or more electrical interfaces 384 that allow camera 358 to be operated or otherwise in data communication with a processor of computing system 100 or another controller (e.g., the electronic control unit and/or actuator unit described below and Illustrated in FIG. 11).

Although a single camera 358 is generally referred to herein, it is appreciated that for some implementations, the term "camera" can refer to a camera unit which can include multiple imaging elements housed within a single or multiple housings. For example, apparatus 352 can include multiple, separately housed cameras and the functionality of "the camera" can be implemented across these multiple cameras in different areas of system 100. As but one example, a first image can be captured by a first camera (e.g., a color camera) and a second image can be captured by a second camera (e.g., an ultraviolet camera). As another example, a first camera can capture an image of a first marker 366 and a second camera can capture an image of a second marker 366.

As illustrated for example in FIG. 9, camera 358 can include a portion having an outer surface 378 that is sized to rotatably mate with an inner surface 376 of support structure 356 to allow camera 358 to be rotatably aligned during installation to an aligned position based on an image captured by camera 358. Outer surface 378 of camera 358 can, for example, be defined by an imaging lens barrel (e.g., lens barrel 382), which can, for example, be substantially cylindrical. Some implementations of camera 358 include an outer surface 378 that is not cylindrical and may, for example, be square, oval, or another suitable shape. In certain implementations, such as implementations where outer surface 378 is not rotationally symmetrical, support structure 356 can include a bearing or other assembly including an inner race that is shaped to mate with outer surface 378 of camera 358 while also allowing camera 358 to rotate relative to support structure 356.

Figure 11:
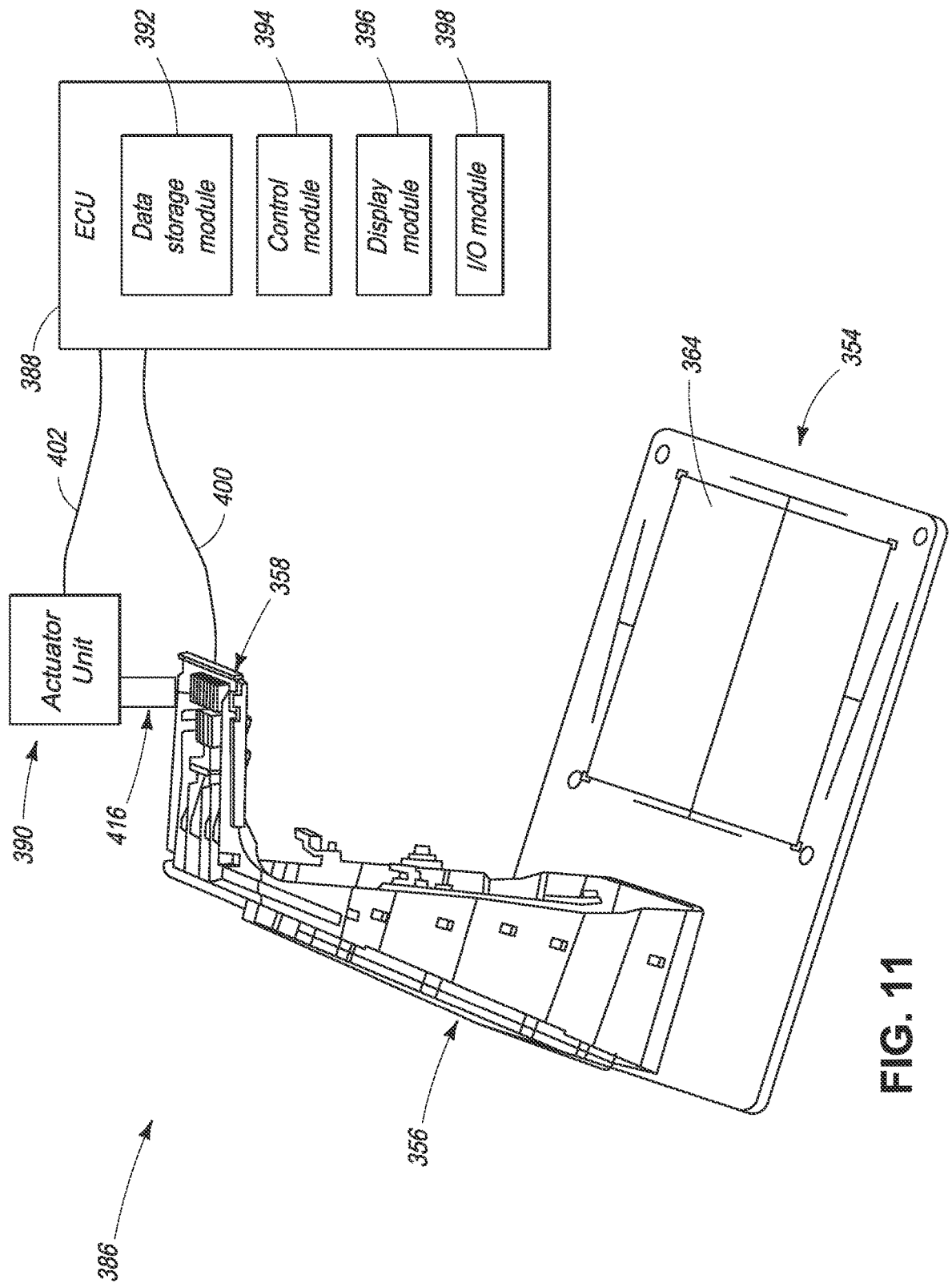
FIG. 11 is an example partially schematic front perspective view of a system in accordance with the principles disclosed herein.

FIG. 11 illustrates a system 386 that can be used to automate one or more steps of determining a misalignment of camera 358 based on an image captured by camera 358 and aligning camera 358 to an alignment position based on the captured image. The description of system 386 refers to certain elements of apparatus 352 and system 100 for illustration. Moreover, certain reference numbers such as the reference numbers for support system 356, calibration plate 354, calibration surface 364, and camera 358 are used for illustration of both apparatus 352 and system 386. However, it is appreciated that system 386 can include fewer, additional, or different elements than apparatus 352 or system 100. It is further appreciated that one or more structural or functional aspects of systems or apparatuses described herein, such as system 100 or apparatus 352, can be implemented in system 386 or vice versa. For example, system 386 can include the same or functionally identical support structure as support structure 110 of system 100 or support structure 356 of apparatus 352. As another example, calibration plate 354 of system 386 can include a calibration surface 364 with image alignment reference markers 366 as described above with respect to apparatus 352.

The implementation of system 386 depicted in FIG. 11 can include support structure 356, camera 358, and calibration plate 354 as described above with respect to FIG. 8, as well as an electronic control unit (ECU) 388, and an actuator unit 390. For illustration, ECU 388 and actuator unit 390 are depicted as being separate units. It is appreciated, however, that these units can be a single unit. For example, in some implementations, ECU 388 and actuator unit 390 are housed within the same housing and share common components (e.g., a common power source).

In some implementations, one or both of ECU 388 and actuator unit 390 are connected to system 386 to assist with installing camera 358 or other elements of system 100 (e.g., to assist with aligning projector assembly 184). In some implementations, after a first camera 358 is installed, ECU 388 and actuator unit 390 are designed to be disconnected from camera 358 and connected to another camera of system 100, thereby allowing a single ECU 388 and actuator unit 390 to align different components on a single system 100. Similarly, in some implementations, after ECU 388 and actuator unit 390 finish aligning camera 358 for a first system 100, ECU 388 and actuator unit 390 are designed to be disconnected from the first system and connected to a second system, thereby allowing a single ECU 388 and actuator unit 390 to align components of different systems.

Although the functionality of ECU 388 described herein primarily relates to alignment during installation, it is appreciated that this disclosure is intended to be applicable to systems that allow alignment of components after installation (e.g., throughout the operational lifespan of system 100). For example, in some implementations, ECU 388 and actuator unit 390 (or components thereof) can be housed within a housing of system 100 so as to allow an operator to make adjustments to the alignment of camera 358 or other components during the operational lifespan of system 100. In implementations where ECU 388 and actuator unit 390 are not housed within a housing of system 100, these units can, for example, be connectable to system 100 after installation so as to allow an operator to make adjustments to the alignment of camera 358 during the operational lifespan of system 386.

The implementation of ECU 388 depicted in FIG. 4 using functional modules for illustration. As used herein, the term "module" refers to a combination of hardware (e.g., a processor such as an integrated circuit or other circuitry) and software (e.g., machine- or processor-executable instructions, commands, or code such as firmware, programming, or object code). A combination of hardware and software can include hardware only (i.e., a hardware element with no software elements), software hosted at hardware (e.g., software that is stored at a memory and executed or interpreted at a processor), or at hardware and software hosted at hardware. Additionally, as used herein, the singular forms "a," "an," and "the" include plural referents unless the context clearly dictates otherwise. Thus, for example, the term "module" is intended to mean one or more modules or a combination of modules.

One or more modules of system 386 can include a processor. Such a processor can, for example, be in the form of a central processing unit (CPU), a semiconductor-based microprocessor, a digital signal processor (DSP) such as a digital image processing unit, other hardware devices or processing elements suitable to retrieve and execute stored instructions, or combinations thereof. The processor can, for example, include single or multiple cores on a chip, multiple cores across multiple chips, multiple cores across multiple devices, or combinations thereof. The processor can be functional to fetch, decode, and execute instructions as described herein. As an alternative or in addition to retrieving and executing instructions, the processor may include at least one integrated circuit (IC), other control logic, other electronic circuits, or combinations thereof that include a number of electronic components for performing the functionality of instructions stored on a memory. The processor may be implemented across multiple processing units and instructions may be implemented by different processing units in different areas of systems described herein (e.g., systems 100 or 386).

One or more modules of system 386 can include a non-transitory computer memory. Such a memory can, for example, be in the form of a non-transitory machine-readable storage medium, such as a suitable electronic, magnetic, optical, or other physical storage apparatus to contain or store information such as executable instructions, data, and the like. As used herein, the term "machine-readable storage medium" may include Random Access Memory (RAM), flash memory, a storage drive (e.g., a hard disk), any type of storage disc (e.g., a Compact Disc Read Only Memory (CD-ROM), any other type of compact disc, a DVD, etc.), and the like, or a combination thereof. In some implementations, the memory can include a main memory, such as a Random Access Memory (RAM), where software may reside during runtime, and a secondary memory. The secondary memory can, for example, include a nonvolatile memory where a copy of software is stored.

The implementation of ECU 388 depicted in FIG. 11 includes a data storage module 392, a control module 394, a display module 396, and an I/O module 398. These modules are described in detail below. It is appreciated that additional, alternative, or fewer modules can be included to achieve the functionality described herein or otherwise desired by an operator.

Data storage module 392 is a functional module of ECU 388 that includes a combination of hardware and software that can, for example, allow ECU 388 to store data for use in aligning camera 358. In some implementations, data storage module 392 includes hardware in the form of a hard drive, related firmware, and other software for allowing the hard drive to operatively communicate with other hardware of systems described herein (e.g., systems 100 or 386). Data storage module 392 can further include information for operation of ECU 388, such as alignment templates, histogram data, tolerance values, or other data used for identifying a misalignment or alignment of camera 358.

Control module 394 is a functional module of system 386 that includes a combination of hardware and software that allows computing system 386 to operate and control camera 358. Several examples of such operation and control functionality for control module 394 are provided below. It is further appreciated that functionality corresponding to one or more steps described below with respect to FIG. 11 can be performed by control module 394. The operations performed by ECU 388, can in certain implementations, be performed by a human operator. For example, the functionality of determining a desired alignment of camera 358 as described below and aligning camera 358 as described below can be performed by a control module 394 in some implementations, and performed by a human operator in other implementations.

Control module 394 can be implemented to instruct camera 358 to capture an image containing an alignment marker (e.g., marker 366). For example, data storage module 392 can contain instructions executable by control module 394 such that system 386 is operative to instruct camera 358 to capture an image containing an alignment marker (e.g., marker 366). Camera 358 can, for example, be instructed to take a still image or video of calibration surface 364 including markers 366, or at least relevant portions of calibration surface 364.

For example, instructions can be provided to camera 358 via signals transmitted through a wired or wireless data pathway (e.g., through a line 400) connecting camera 358 to actuator unit 390 or ECU 388. It is appreciated that in some implementations, ECU 388 can wirelessly instruct camera 358 to capture an image, via a wireless receiver connected to camera 358. In some implementations, control module 394 instructs camera 358 to capture an image by providing instructions to actuator unit 390 or another actuator to physically actuate a capture button on camera 358. For example, control module 394 can actuate a remote shutter release switch that actuates a shutter button on camera 358.

Control module 394 can be implemented to receive captured image data from camera 358. For example, data storage module 392 can contain instructions executable by control module 394 such that system 386 is operative to receive captured image data from camera 358. The image data can, for example, be provided to control module 394 from camera 358 via signals transmitted through a wired or wireless data pathway (e.g., through line 400) connecting camera 358 to actuator unit 390 or ECU 388.

Control module 394 can be implemented to determine a misalignment of camera 358 with respect to marker 366 based on received image data. For example, data storage module 392 can contain instructions executable by control module 394 such that system 386 is operative to determine a misalignment of camera 358 with respect to marker 366 based on received image data.

As described above, camera 358 can take a still image or video of calibration surface 364 including markers 366, or at least relevant portions of surface 364. A histogram of the image/video may provide regions of interest, and in some implementations can generally providing an indication of the difference in color intensity between a color of the calibration surface 364 and a color of markers 366 (which can, for example, be in the form of markings on calibration surface 364, an edge of calibration plate 354, or another suitable alignment indicator). In some implementations, histogram equalization may be performed on the regions of interest to obtain high and low thresholds for a mark detection algorithm (e.g., Canny edge detection). For example, upon running an algorithm to detect the edge of calibration plate 354 for alignment, edge points indicating the perimeter of calibration plate 354 may be extracted (e.g., edge points for all four sides of calibration plate 354).

A line fitting algorithm may be used for determining four fitted lines, which may be representative of the perimeter of calibration plate 354 or a portion thereof. Intersection of two lines from the four fitted lines may be used for calculating the outside corners of calibration plate 354. When a still image of calibration surface 364 is captured by camera 358, one or more of the markers (e.g., markers 366) may be determined even if one or more of the marks are occluded by an object in the still image (e.g., an object resting on calibration surface 364). This can, for example, be accomplished by analyzing other portions of calibration surface 364 that can indicate a misalignment or alignment of camera 358.

When using camera 358 to capture an image of calibration surface 364, camera 358 may also capture objects in the background or surrounding calibration surface 364. These background objects may affect the ability to differentiate between the color intensities of markers 366. For example, a background object may be confused for a portion of calibration plate 354. In some implementations, calibration plate 354 may include an IR-absorbing coating that serves as an image alignment reference marker 366 for detection by a sensor from sensor bundle 164 (e.g., IR camera or depth sensor 164c). The IR-absorbing coating may be robustly detected by the IR camera. As a result, calibration plate 354 as detected by the IR camera, may be distinct compared to other objects under the IR camera (e.g., from the objects in the background or surrounding calibration surface 364).

Although the use of different colors are described for differentiating markers 366 from other areas of calibration surface 364, it is appreciated that different materials or other aspects may be used instead for differentiation. For example, a border of calibration plate 354 may be coated with an IR-absorbing material for detection of a border by a sensor from sensor bundle 164 (e.g., IR camera).

Control module 394 can be set up to instruct actuator unit 390 to align camera 358 to a first aligned position determined based on received image data. For example, data storage module 392 can contain instructions executable by control module 394 such that system 386 is operative to align camera 358 to a first aligned position determined based on received image data. References herein to aligning or rotating camera 358 are intended to refer to aligning or rotating one or more portions of camera 358 such that an image captured by camera 358 is rotated. For example, in some implementations, an entire outer housing of camera 358 is aligned or rotated, whereas in other implementations, a portion of camera 358, such as lens barrel 382 is aligned or rotated relative to other elements of camera 358 so as to rotate an image captured by camera 358.

Figure 12:
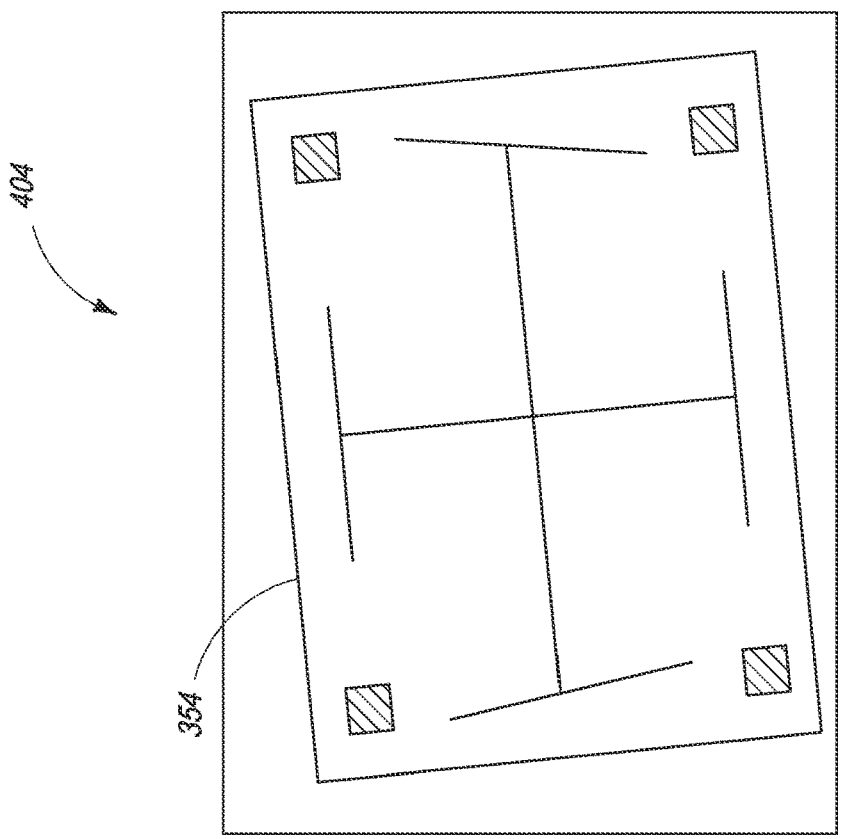
FIG. 12 is an example schematic top view of an image captured by a camera for the system of FIG. 11 in an initial misaligned position.

Camera 358 can be rotatably aligned along rotational axis 370 (illustrated, for example, in FIG. 8), which can for example, correspond to an imaging axis of camera 358. For illustration, FIGS. 12 and 13 provide an example of a captured image 404 of calibration plate 354 in an initial misaligned position compared to a captured image 406 of calibration plate 354 in an aligned position. In implementations where camera 358 is aligned along more than one rotational axis, camera 358 can, for example, be first aligned along a first rotational axis and then rotated along a second rotational axis.

Actuation instructions can, for example, be provided from ECU 388 to actuator unit 390 via signals transmitted through a wireless or wired interface (e.g., through electrical line 402) connecting actuator unit 390 to ECU 388. In some implementations, ECU 388 can instruct actuator unit 390 by providing control signals to actuator unit 390 as well as a motive force for driving actuator unit 390. For example, when actuator unit 390 is an electromechanical actuator, ECU 388 can provide a voltage differential through line 402 that drives a motor of the actuator. In some implementations, actuator unit 390 can provide its own motive force that is triggered by control signals from ECU 388. For example, actuator unit 390 can be powered by a separate power source for driving an electric motor of an electromechanical actuator.

Control module 394 can be implemented to iterate one or more functionalities described above or other functionalities. For example, control module 394 can instruct camera 358 to capture a second image, receive image data for the second image, and determine a second alignment position if the first alignment position is determined by control module 394 or a human operator to be unsatisfactory. In such situations, control module 394 can then instruct actuator unit 390 a second time to align camera 358 in a second aligned position. In some implementations, control module 394 can then capture a third image for determining whether the alignment is satisfactory. For example, data storage module 392 can contain instructions executable by control module 394 such that system 386 is operative to align camera 358 to a first aligned position determined based on received image data. For example, in some implementations, data storage module 392 can contain instructions executable by control module 394 such that system 386 is operative to perform this iterative functionality.

Control module 394 can be implemented to secure camera 358 to support structure 356 in the aligned position during and after installation of camera 358. For example, data storage module 392 can contain instructions executable by control module 394 such that system 386 is operative to secure camera 358 to support structure 356 in the aligned position during and after installation of camera 358. In some implementations, before securing camera 358, control module 394 may run a final check to determine whether the alignment of camera 358 is satisfactory.

Control module 394 can secure camera 358 to support structure 356 using a securing element (e.g., securing element 380 described above with respect to apparatus 352).

For example, in some implementations, the securing element can include one or more screws, that are screwed into corresponding holes of support structure 356 using a robotically controlled screwdriver.

Display module 396 is a functional module of system 386 that includes a combination of hardware and software that allows computing system 386 to display feedback relative to operation of ECU 388. In some implementations, ECU 388 does not include a display module 396. Display module 396 can, for example, include hardware in the form of a computer monitor, related firmware, and other software for allowing the computer monitor to operatively communicate with other hardware of system 386. It is appreciated that in some implementations, display module 396 can include hardware in the form of a display port and/or video card.

I/O module 398 can be used, for example, to operate ECU 388 or one or more other elements of system 386. For example, I/O module 398 can additionally or alternatively include a keyboard, mouse, stylus, touchscreen, speaker, monitor, etc., to allow communication to and from components of system 100 or 386. In some implementations, ECU 388 does not include an I/O module, component hardware, or related controls. For example, ECU 388 may be operated remotely by separate computer system that is in data communication with ECU 388. As another example, ECU 388 may include only minimal input controls, such as a single START button that can be activated to automatically perform an alignment process with system 386.

As described above, actuator unit 390 can, for example, be used to align camera 358 relative to support structure 356. Actuator unit 390 can include any suitable type of actuator for this purpose, such as for example certain electromechanical, hydraulic, pneumatic, piezoelectric, and/or magnetic actuators. For example, in some implementations, actuator unit 390 includes an electromechanical actuator with a motor controlled by ECU 388. In some implementations, actuator unit includes an arm 416 or other element that is designed to securely rotate camera 358.

Figure 14:
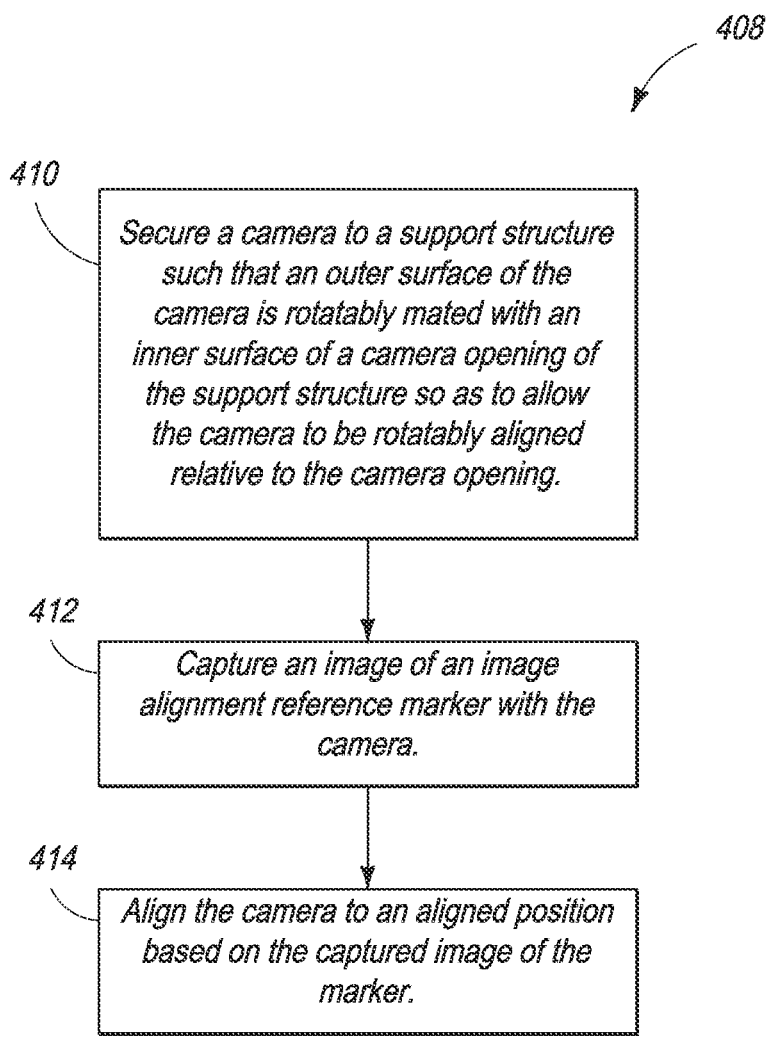
FIG. 14 is an example flowchart for a method in accordance with the principles disclosed herein.

FIG. 14 is a flowchart for a method 408 to align a camera based on an image captured by camera that includes a reference marker, according to an example. The descriptions of method 408 refers to elements of apparatuses and systems described herein for illustration, however, it is appreciated that this method can be used for any suitable apparatuses and systems. Moreover, although the flowchart of FIG. 14 shows a specific order of performance, this order may be rearranged into another suitable order, may be executed concurrently or with partial concurrence, or a combination thereof. Likewise, suitable additional and/or comparable steps may be added to method 408 to achieve the same or comparable functionality.

Method 408 includes a step 410 of securing camera 358 to support structure 356 such that camera 358 is positioned relative to camera opening 374 so as to allow camera 358 to capture an image containing image alignment reference marker 366 through camera opening 374. Camera 358 can be secured to support structure 356 so that it is allowed to rotate with respect to support structure 356. For example, in some implementations, camera 358 can be secured to support structure 356 such that outer surface 378 of camera 358 is rotatably mated with inner surface 376 of camera opening 374 to allow camera 358 to be rotatably aligned relative to camera opening 374. As described above with respect to apparatus 352, camera 358 can be secured to support structure 356 using a securing element (e.g., securing element 380), which can, for example, be in the form of a rigid fastener, such as a screw, bolt, nail, or the like, or another type of securing element, such as a magnet-based securing assembly, adhesive, fabric hook and loop fastener, etc. In some implementations, camera 358 can be temporarily secured to support structure 356 before the aligning steps described below and then further secured or re-secured following alignment. Step 410 can, for example, be performed by a human operator, robotically assisted, or performed automatically by a robotic operator. For example, a human operator can secure camera 358 to support structure 356 by screwing a screw that passes through a portion of camera 358.

Method 408 includes a step 412 of capturing an image of marker 366 with camera 358. An image can, for example, be captured by physically actuating a capture button on camera 358. It is appreciated that the term "an image" or similar terms used herein are intended to include a single still image as well as a set of still images, which can, for example, be provided in the form of a real-time or time-lapse video.

In some implementations, an image can be captured by instructing camera 358 to capture an image via an electrical control signal. Step 412 can, for example, be performed by a human operator, robotically assisted, or performed automatically by a robotic operator. For example, as described above with respect to ECU 388, step 412 can be performed with an ECU 388 that provides a control signal to camera 358 to capture an image. As described herein, camera 358 can record an image using electronic sensors. However, in certain implementations, camera 358 can record an image using photographic film or another non-electronic medium. Information regarding such a non-electronically recorded image can, in some implementations, be digitized or otherwise converted to electronic format for later processing steps.

Method 408 includes a step 414 of aligning camera 358 to an aligned position based on the captured image of marker 366. Step 414 can, for example, be performed by a human operator, robotically assisted, or performed automatically by a robotic operator. For example, in some implementations, a human operator can review the captured image of marker 366, determine an appropriate alignment for camera 358 based on the captured image, and manually rotate camera 358 to an aligned position. In some implementations, camera 358 can provide an updated feed of captured images of marker 366 so that an operator can see the effect of aligning camera 358 in real-time.

In implementations where step 414 or certain elements of step 414 are performed electronically, as described above with respect to ECU 388, a controller can, for example, be used to review a captured image of marker 366, determine an appropriate alignment for camera 358 based on the captured image, and rotate camera 358 to an aligned position.

In some implementations, method 408 can include a step of securing camera 358 in the aligned position. Camera 358 can be secured using a securing element in the form of a rigid fastener, such as a screw, bolt, nail, or the like, or another type of securing element, such as a magnet-based securing assembly, adhesive, fabric hook and loop fastener, etc. This step can, for example, be performed by a human operator, robotically assisted, or performed automatically by a robotic operator. For example, a human operator can secure camera 358 to support structure 356 by tightening a screw that passes through a portion of camera 358 and into support structure 356.

One or more steps of method 408 can be repeated if the image is still misaligned following a first iteration or otherwise desired (e.g., to confirm the alignment of camera 358). For example, in some implementations, method 408 can include a step of capturing a second image of marker 366 while camera 358 is in the aligned position, aligning camera 358 to a second aligned position based on the second captured image of marker 366, and securing camera 358 in the second aligned position.

It is appreciated that the functionality of ECU 388 and steps of method 408 described herein can be applied at any desired time during the lifespan of the apparatuses and systems described herein. For example, in some implementations, it can be determined (through a human operator or electronic controller) that camera 358 or another element of system 386 is misaligned after camera 358 is already installed. This can occur, for example, if camera 358 was not properly aligned during installation, or if camera 358 was knocked out of alignment during use, or if a desired alignment position has changed after installation. In such situations, one or more steps described herein can, for example, be performed after installation in order to align camera 358.

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. As another example, functionalities discussed above in relation to specific modules or elements can be included at different modules, engines, or elements in other implementations. Furthermore, it should be understood that the systems, apparatuses, and methods described herein can include various combinations and/or sub-combinations of the components and/or features of the different implementations described. Thus, features described with reference to one or more implementations can be combined with other implementations described herein.

As used herein, the term "provide" includes push mechanisms (e.g., sending data independent of a request for that data), pull mechanisms (e.g., delivering data in response to a request for that data), and store mechanisms (e.g., storing data at an intermediary at which the data can be accessed). Furthermore, as used herein, the term "based on" means "based at least in part on." Thus, a feature that is described based on some cause, can be based only on the cause, or based on that cause and on one or more other causes. Moreover, the term "set of items" and related terms used herein, is intended to refer to a set of one or more items.

The above discussion is meant to be illustrative of the principles and various implementations of the present invention. Numerous variations and modifications will become apparent to those skilled in the art once the above disclosure is fully appreciated. It is intended that the following claims be interpreted to embrace all such variations and modifications.

What is claimed is:

1. An apparatus comprising:
 a calibration surface including an image alignment reference marker; and
 a support structure to support a camera to face towards the calibration surface,
 wherein the support structure includes a camera opening to allow the camera to capture an image containing the marker through the camera opening, the camera opening including an inner surface sized to rotatably mate with an outer surface of the camera to allow the camera to rotate relative to the inner surface of the camera opening to rotatably align the camera with an aligned position based on the captured image, and
 wherein the support structure includes a securing element to allow the camera to be secured to the support structure in the aligned position during installation of the camera.

2. The apparatus of claim 1, wherein the calibration surface includes four image alignment reference markers that correspond to the four corners of an image captured by the camera in the aligned position.

3. The apparatus of claim 1, wherein the support structure includes a cover for the camera that restricts tampering of the camera's alignment after the camera is installed.

4. The apparatus of claim 1, wherein the inner surface of the camera opening is sized to rotatably mate with the outer surface of the camera to allow the camera opening to be rotatably aligned along an imaging lens axis of the camera.

5. The apparatus of claim 1, wherein the inner surface of the camera opening is cylindrical and sized to securely rotatably mate with a cylindrical lens barrel of the camera.

6. The apparatus of claim 1, wherein the support structure is securable to the calibration surface to support the camera above the calibration surface at a predetermined position relative to the marker.

7. The apparatus of claim 1, further comprising:
 a calibration plate securable to the support structure, the calibration surface being located on the calibration plate.

8. The apparatus of claim 1, further comprising:
 a camera to capture an image containing the marker through the camera opening.

9. A system comprising:
 a camera support structure that is dimensioned to support a camera to face towards an image alignment reference marker;
 an actuator connectable to the camera to adjust the rotational alignment of the camera along an imaging axis of the camera;
 a control module connectable to the camera to communicate with the camera; and
 a data storage module containing instructions executable by the processor such that the system is operative to:
  instruct the camera to capture an image containing the marker;
  receive image data from the camera corresponding to the captured image; and
  actuate the actuator to adjust the rotational alignment of the camera to an aligned position based on the received data.

10. The system of claim 9, further comprising:
 a camera securable to the support structure in the aligned position.

11. The system of claim 9, wherein the data storage module contains instructions executable by the control module such that the system is further operative to:
 instruct the camera to capture a second image containing the marker in the aligned position;
 receive image data from the camera corresponding to the second captured image; and
 actuate the actuator to adjust the rotational alignment of the camera to a second aligned position based on the second captured image of the marker.

12. A method comprising:
 securing a camera to a support structure such that the camera is positioned relative to a camera opening in the support structure so as to face the camera towards an image alignment reference marker, the camera being secured to the support structure such that an outer surface of the camera is rotatably mated with an inner surface of the camera opening to allow the camera to rotate relative to the inner surface to align the camera;

capturing an image of the marker with the camera; and aligning the camera to an aligned position based on the captured image of the marker.

13. The method of claim 12, further comprising:

securing the camera in the aligned position.

14. The method of claim 12, further comprising:

capturing a second image of the marker while the camera is in the aligned position; and aligning the camera to a second aligned position based on the second captured image of the marker.

15. The method of claim 12, further comprising:

securing the support structure to a calibration surface that includes the image alignment reference marker, the support structure being secured to the calibration surface such that a camera opening of the support structure is positioned at a predetermined position relative to the calibration surface.

\* \* \* \* \*